(12) United States Patent
Li et al.

(10) Patent No.: US 10,520,680 B2
(45) Date of Patent: Dec. 31, 2019

(54) OPTICAL FIBER CONNECTOR FERRULE ASSEMBLY HAVING SINGLE REFLECTIVE SURFACE FOR BEAM EXPANSION AND EXPANDED BEAM CONNECTOR INCORPORATING SAME

(71) Applicant: NANOPRECISION PRODUCTS, INC., El Segundo, CA (US)

(72) Inventors: Shuhe Li, Pasadena, CA (US); Robert Ryan Vallance, Newbury Park, CA (US); Rand D. Dannenberg, Newbury Park, CA (US); Matthew Gean, Camarillo, CA (US)

(73) Assignee: NANOPRECISION PRODUCTS, INC., Camarillo, CA (US)

( * ) Notice: Subject to any disclaimer, the term of this patent is extended or adjusted under 35 U.S.C. 154(b) by 0 days.

(21) Appl. No.: 15/680,203

(22) Filed: Aug. 17, 2017

(65) Prior Publication Data

US 2018/0128992 A1 May 10, 2018

Related U.S. Application Data

(60) Provisional application No. 62/376,245, filed on Aug. 17, 2016.

(51) Int. Cl.
*G02B 6/38* (2006.01)
*G02B 6/42* (2006.01)

(52) U.S. Cl.
CPC ......... *G02B 6/3845* (2013.01); *G02B 6/3829* (2013.01); *G02B 6/3838* (2013.01);
(Continued)

(58) Field of Classification Search
CPC .. G02B 6/3845; G02B 6/3851; G02B 6/3874; G02B 6/3877; G02B 6/3881;
(Continued)

(56) References Cited

U.S. PATENT DOCUMENTS

| 10,241,275 B2 | 3/2019 | Li et al. |
| 2012/0063725 A1* | 3/2012 | Meadowcroft ...... G02B 6/4286 |
| | | 385/88 |

(Continued)

FOREIGN PATENT DOCUMENTS

WO  2017/066138  4/2017

OTHER PUBLICATIONS

International Search Report of Counterpart PCT International Application No. PCT/US2017/047460.

*Primary Examiner* — Michael P Mooney
(74) *Attorney, Agent, or Firm* — Liu & Liu

(57) ABSTRACT

An expanded beam ferrule includes a first ferrule halve having reflective surfaces and a second ferrule halve, which together retain optical fibers. The reflective surfaces output light perpendicular to the mid-plane of the ferrule. A sleeve aligns the external surface of two similar ferrules, with the reflective surfaces of the respective ferrules facing each other. Output light from an optical fiber held in the first ferrule is bent and collimated by a reflective surface, transmitted to the facing reflective surface in a second ferrule aligned by the sleeve, which bends the light to input to the optical fiber held in the second ferrule. The ferrule components and/or sleeve are precision formed by high throughput metal stamping. The ferrule is incorporated in an optical fiber connector.

19 Claims, 18 Drawing Sheets

(52) U.S. Cl.
CPC ......... *G02B 6/3862* (2013.01); *G02B 6/3874* (2013.01); *G02B 6/3885* (2013.01); *G02B 6/4214* (2013.01)

(58) Field of Classification Search
CPC .. G02B 6/3885; G02B 6/3829; G02B 6/3838; G02B 6/3852; G02B 6/3862; G02B 6/4214
USPC ........................................ 385/60, 62, 65, 66
See application file for complete search history.

(56) References Cited

U.S. PATENT DOCUMENTS

| | | | |
|---|---|---|---|
| 2014/0193116 A1* | 7/2014 | Bylander | G02B 6/4214 385/33 |
| 2015/0050019 A1 | 2/2015 | Sengupta | |
| 2015/0338585 A1 | 11/2015 | Li et al. | |
| 2016/0033724 A1 | 2/2016 | Bylander et al. | |
| 2017/0184801 A1* | 6/2017 | Isenhour | G02B 6/3817 |

* cited by examiner

OPTICAL FIBER CONNECTOR FERRULE ASSEMBLY HAVING SINGLE REFLECTIVE SURFACE FOR BEAM EXPANSION AND EXPANDED BEAM CONNECTOR INCORPORATING SAME

PRIORITY CLAIM

This application claims the priority of U.S. Provisional Patent Application No. 62/376,245 filed on Aug. 17, 2016, which is fully incorporated by reference as if fully set forth herein. All publications noted below are fully incorporated by reference as if fully set forth herein.

BACKGROUND OF THE INVENTION

Field of the Invention

The present invention relates to optical fiber expanded beam connectors, in particular ferrule assemblies in expanded beam connectors.

Description of Related Art

There are many advantages of transmitting light signal via optical fiber waveguides and the use thereof is diverse. Single or multiple fiber waveguides may be used simply for transmitting visible light to a remote location. Complex telephony and data communication systems may transmit digitized data through optical signals within the waveguides. These applications couple fibers in an end-to-end relationship, with the coupling being one source of light loss. Precision alignment of two polished ends of fibers is needed to ensure that optical loss in a fiber link is less than the specified optical loss budget for a system. For single-mode telecommunication-grade fiber, this typically corresponds to connector fiber alignment tolerances that are less than 1000 nm. This means that in both parallel fiber and single fiber links, operating at multi-gigabit rates, the components applied to align the fibers must be assembled and fabricated with sub-micron precision.

In an optical fiber connection, an optical fiber connector terminates the end of a cable that contains one or multiple fibers, and enables quicker connection and disconnection as compared to splicing. The connectors mechanically couple and align the cores of fibers so that light can pass end-to-end. The end of an optical fiber is supported in a ferrule, with an end face of the optical fiber positioned generally flush with or slightly protruding from an end face of the ferrule. When complementary ferrules in connector assemblies are mated, the optical fiber of one ferrule is aligned with a mating optical fiber of the other ferrule. Better connectors lose very little light due to reflection or misalignment of the fibers. Connectors, in both parallel/multiple fiber and single fiber links, operating at multi-gigabit rates must be assembled with subcomponents fabricated with sub micron precision. As if producing parts with such precision levels were not challenging enough, for the resulting end products to be economical it must be done in an automated, high-speed process.

In some applications, the end faces of mating optical fibers physically contact one another to effect signal transmission between the mating optical fiber pair. In such applications, various factors may reduce the efficiency of light transmission between the optical fiber pair, such as irregularities, burrs or scratches in the fiber end faces, misalignment of the optical fiber pair, as well as dust or debris between the optical fibers at the mating interface. Due to the small optical path relative to the size of any foreign objects such as dust or debris, any such foreign objects will interfere with the transmission of light.

Heretofore, prior art expanded beam connectors have been developed to expand the size of the optical beam and transmit the beam through an air gap between the connectors. By expanding the beam, the relative size difference between the dust or debris and the beam is increased which thus reduces the impact of any dust or debris as well as any misalignment on the efficiency of the light transmission. As a result, expanded beam optical fiber connectors are often preferable in relatively dirty and high vibration environments.

Heretofore, prior art expanded beam connectors include a lens mounted adjacent an end face of each optical fiber. Two types of lenses are commonly used—collimating and cross-focusing. A collimating lens receives light output from a first optical fiber and expands the beam to a relatively large diameter. When using a collimating lens, a second lens and ferrule assembly is similarly configured with a collimating lens positioned adjacent the end face of a second optical fiber for receiving the expanded beam, and refocuses the beam at the input end face of the second optical fiber. A cross-focusing lens receives the light from a first optical fiber, expands it to a relatively large diameter and then focuses the light from the relatively large diameter at a specific focal point. With cross-focusing lenses, the lens and ferrule assembly may be mated with either another lens and ferrule assembly having a cross-focusing lens or with a non-lensed ferrule assembly as is known in the art.

Currently, it is generally accepted that prior art optical fiber connectors cost too much to manufacture and the reliability and loss characteristics are more to be desired. The lens in an expanded beam connector is an additional component, which is required to be optically coupled to the end face of the optical fiber in an assembly, thus requiring additional component costs and additional manufacturing costs. Prior art expanded beam connectors still result in relatively high insertion losses and return losses.

The costs of producing optical fiber connectors must decrease if fiber optics is to be the communication media of choice for short haul and very short reach applications. The relatively widespread and ever increasing utilization of optical fibers in communication systems, data processing and other signal transmission systems has created a demand for satisfactory and efficient means of inter-connecting terminated optical fiber terminals.

It is therefore desirable to develop an improved optical fiber expanded beam connector, which has low insertion loss and low return loss, and which can be fabricated in high throughput and at low costs.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

SUMMARY OF THE INVENTION

Figure 1A:
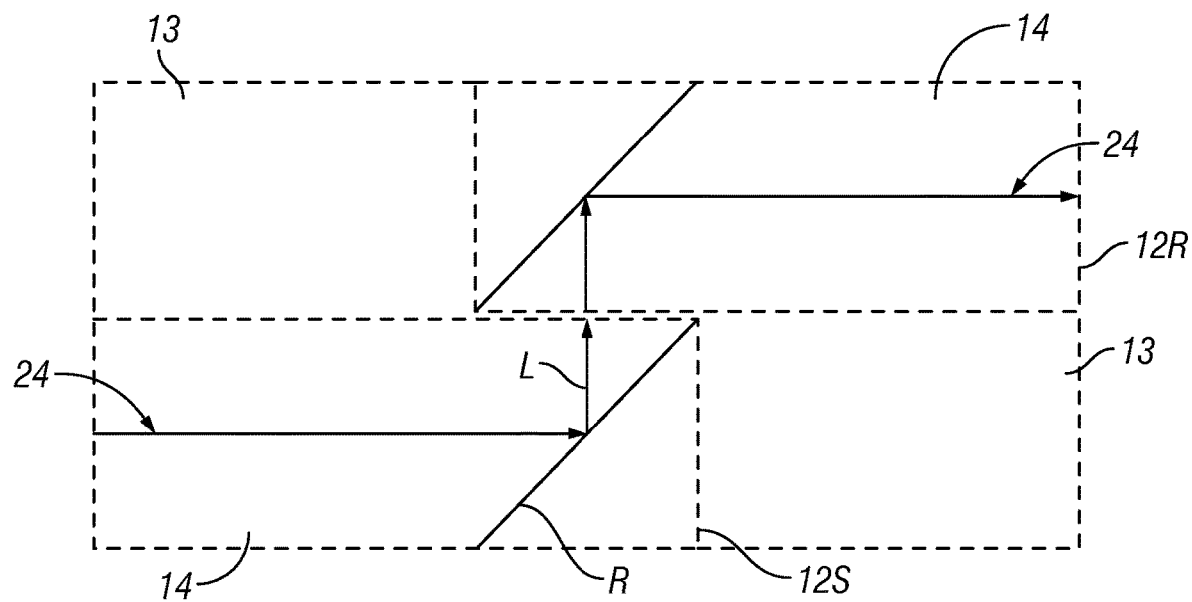
FIGS. 1A-1C are schematic views of the optical path between two aligned ferrules in accordance with one embodiment of the present invention.

The present invention provides an optical fiber ferrule or ferrule assembly for expanding light beam in an optical fiber expanded beam connector, which overcomes many of the drawbacks of the prior art ferrules and connectors, including low insertion and return losses, ease of use and high reliability with low environmental sensitivity, and which can be fabricated at low cost. Given the configuration of the inventive ferrules, the foot-print or form factor of the housing of the optical fiber connector incorporating the inventive ferrule for multi-fibers can be similar to that of housings that currently use prior art cylindrical ferrules designed for only a single fiber (i.e., the inventive ferrules may be incorporated in industry standard connector housings designed for single fiber, such as SC, FC, ST, SMA, LC, Dual LC, etc., type housings.)

In one aspect of the present invention, the inventive ferrule assembly comprises a first ferrule halve having an integrated reflective surface and a complementary second ferrule halve, which together securely retain and accurately align the end of at least one optical fiber with respect to the external geometry of the ferrule halves/assembly. In one embodiment, a groove is provided on the ferrule halves to retain and align a bare section at the end of each optical fiber (with cladding exposed, without protective buffer and jacket layers). The end of the optical fiber is thus terminated by the ferrule assembly.

The integrated reflective surface is located near the distal end of the first ferrule halve, beyond the end face of the optical fiber, which bends light with respect to the optical axis of the optical fiber held in the ferrule assembly. In one embodiment, the reflective surface bends light by 90 degrees. The end of the first ferrule halve extend with the reflective surface beyond the distal end of the complementary second ferrule halve. In one embodiment, the ferrule assembly is configured to retain and align a plurality of optical fibers, with a plurality of reflective surfaces provided on the first ferrule halve, each corresponding to one optical fiber.

The ferrule assembly has an external surface for alignment with a complementary surface of an external alignment sleeve (i.e., the inside surface of a generally cylindrical or tubular sleeve). The external surface of the ferrule assembly is generally cylindrical, having a contact surface profile with a cross-section that is generally oval. Two similarly terminated optical fibers can be optically coupled end-to-end by the alignment sleeve. In use, two similar ferrule assemblies are inserted into the alignment sleeve, with the reflective surfaces of the extended ends of the respective ferrule assemblies facing each other. Output light from the optical fiber held in a first ferrule assembly is bent by the reflective surface to be transmitted to the facing reflective surface at the second ferrule assembly, which bends the light to be directed to be input to the optical fiber held in the second ferrule assembly. The optical path resembles a "Z", which includes two 90-degree bends in one embodiment.

In one embodiment, the reflective surface R is an opaque free surface facing away from the body of the ferrule halve. The free surface is exposed to the exterior (e.g., air or an index matching material), and reflecting incident light directed at the free surface from the exterior side (i.e., the incident light is not directed through the body of the ferrule). The reflective surface in the ferrule assembly is structured with a reflective geometry that bends (i.e., turns or folds) and reshapes (i.e. collimates) output light from the end face of the optical fiber held in the ferrule assembly (or in reverse, bends and reshapes (i.e., focuses) external collimated light incident at the reflective surface of the ferrule assembly at the end face of the optical fiber held in the ferrule assembly). In one embodiment, the reflective surface is structured to be concave reflective (e.g., an aspherical mirror surface). The structured reflective surface is optically aligned with the optical axis of the optical fiber along the desired optical path, with the end face of the optical fiber located at a desired distance from the reflective surface for the desired level of beam expansion. The spot size of the collimated expanded beam is related to the distance along the optical path between the end face of the optical fiber and the reflective surface.

In another aspect of the present invention, the ferrule components and/or sleeve are precision formed by high throughput processes, such as stamping a metal blank material. In one embodiment, the ferrule body is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). Each ferrule halve may be stamped to form a unitary or monolithic body, which does not require further attachment of sub-components within the ferrule halve.

In another aspect of the present invention, the ferrule assembly is incorporated in an optical fiber connector.

The ferrule in accordance with the present invention overcomes many of the deficiencies of the prior art, resulting in an optical fiber expanded beam connector with low insertion and return losses, which provides ease of use and high reliability with low environmental sensitivity, and which can be fabricated at low cost.

Accordingly, the present invention is directed to: An expanded beam ferrule includes a first ferrule halve having reflective surfaces and a second ferrule halve, which together retain optical fibers. The reflective surfaces output light perpendicular to the mid-plane of the ferrule. A sleeve aligns the external surface of two similar ferrules, with the reflective surfaces of the respective ferrules facing each other. Output light from an optical fiber held in the first ferrule is bent and collimated by a reflective surface, transmitted to the facing reflective surface in a second ferrule aligned by the sleeve, which bends the light to input to the optical fiber held in the second ferrule. The ferrule components and/or sleeve are precision formed by high throughput metal stamping. The ferrule is incorporated in an optical fiber connector.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

Figure 1B:
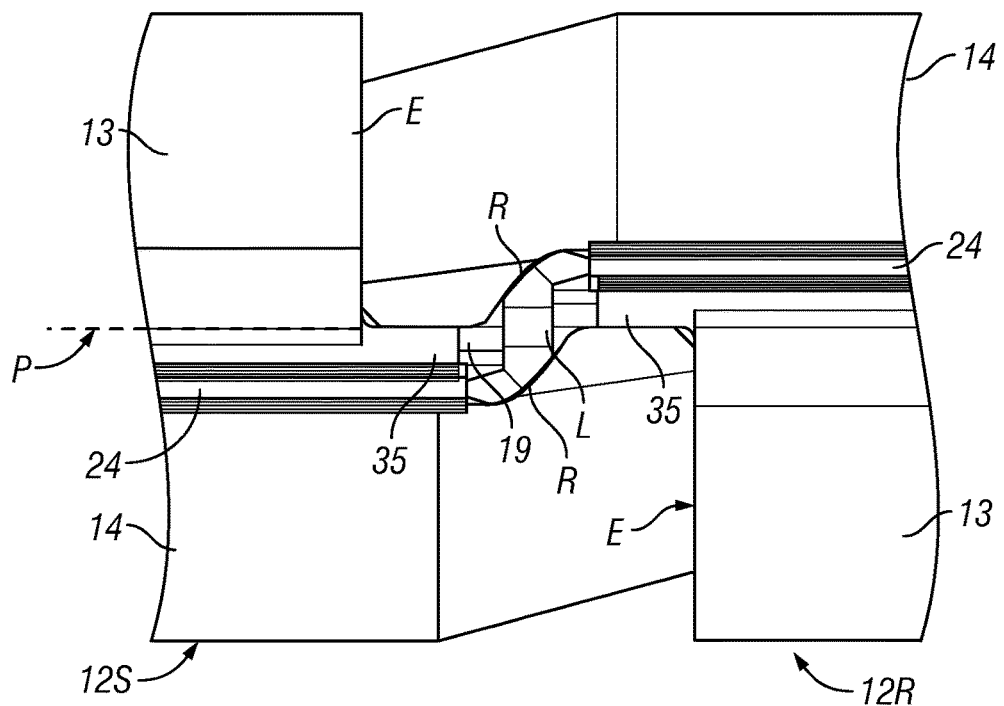
Figure 1C:
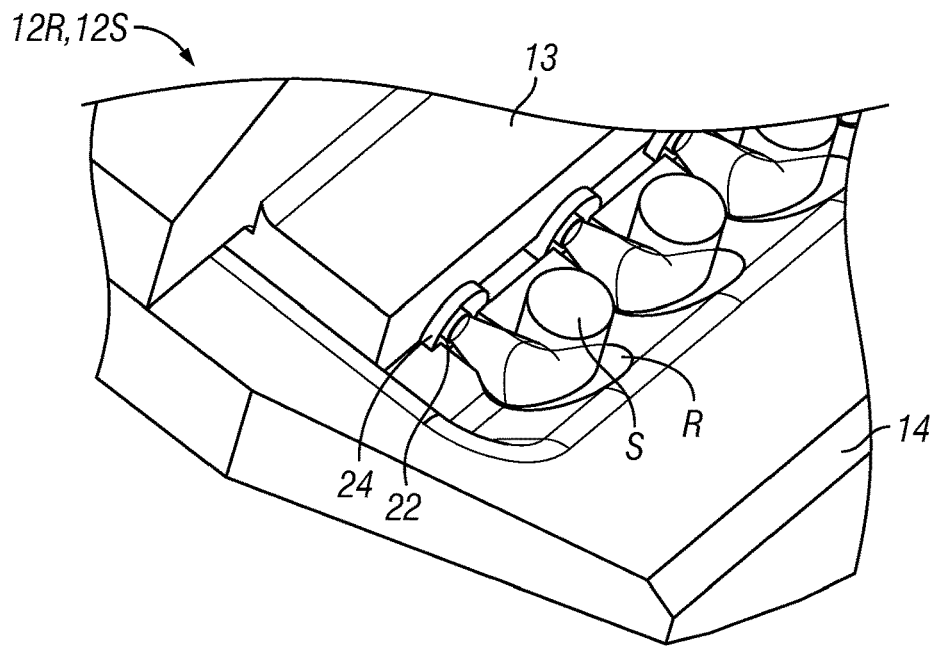

FIGS. 1A-1C are schematic views illustrating the optical path between two aligned ferrule assemblies incorporated in optical fiber connectors in accordance with one embodiment of the present invention. For simplicity, hereinafter, "ferrule assembly" will be referred simply as a "ferrule", which has two ferrule halves. Further details on the ferrule will be disclosed hereinbelow.

FIG. 1A schematically illustrates the light beam L from a source ferrule 12S to a receiving ferrule 12R. The source ferrule 12S and the receiving ferrule 12R each includes an integrated reflective surface R (e.g., a collimating/focusing mirror) of similar optical geometry. In one embodiment, the ferrules 12R and 12S may have similar or identical overall physical structure. The reflective surfaces R of the respective ferrules overlap (in a cross-sectional plane perpendicular to the longitudinal axis of the ferrules) and face each other. Light beam L emitted from the output end of an optical fiber 24 held in the source ferrule 12S is turned and collimated by its reflective surface R, to be incident at the reflective surface R at the receiving ferrule 12S, which then turns and focuses the collimated light beam at the input end of an optical fiber 24 held in the receiving ferrule 12R. In one embodiment, the reflective surface R reflects light from/to the optical fiber 24 to/from outside the ferrule, at a 90-degree angle between the optical fiber axis/longitudinal axis/mid-plane (or mating plane) P of the ferrule and the output/input of the ferrule. The optical path L resembles a "Z", which includes two 90-degree bends in the illustrated embodiment.

FIG. 1C is a partial view showing the region of the extended end of an embodiment of the ferrules 12R and 12S having the reflective surfaces R. In this embodiment, a plurality of optical fibers 24 are held in the ferrule. FIG. 1B illustrates the relative positions of the ferrules 12R and 12S, and the light beam/path L between the optical fibers 24 in the ferrules, conforming to the schematics shown in FIG. 1A.

As shown in FIG. 1B, the optical path L resembles a "Z", which includes two 90-degree bends. The optical axes (or centerlines) of the optical fibers 24 are spaced substantially in parallel, and the light output from the source ferrule 12S and the light input into the receiving ferrule 12R are substantially perpendicular to the optical axis (or centerline) of the optical fibers 24 held in the respective ferrules. The centerlines of the respective optical fibers 24 are offset on either side of and parallel to the mid-plane P in each ferrule (12R, 12S). Given the divergence of the emitted light beam L from the source optical fiber 24 held in the ferrule 12S, the light beam L expands before reaching the reflective surface R, and the resultant collimated light would have a diameter/spot size S significantly larger than the spot size of the light beam emerging from the end face of the optical fiber 24 (see FIG. 1C). Accordingly, the section of the light beam L between the reflective surfaces R of the ferrules 12R and 12S would be an expanded beam.

As shown in FIG. 1B, the optical fibers 24 terminated by ferrules 12R and 12S are optically coupled by the expanded beam present in a cavity 19 defining a space between the reflective surfaces R of the respective ferrules 12R and 12S (e.g., the respective fiber centerlines are at a distance of about 0.15 mm on either side of and parallel to the mid-plane P of the ferrule, to create a space of about 0.3 mm between the fiber centerlines). Hence, there is no physical contact between the end faces of the optical fibers 24. There is however still contact between the ends of the ferrules 12R and 12S to maintain alignment of the ferrules 12R and 12S in the axial direction of the ferrules using an alignment sleeve (shown in FIGS. 2B and 2C). This relaxes the requirements for the end face geometry. No mechanical polishing of the ferrule end faces would be required, thus simplifying fabrication process and reducing fabrication costs. Further, the relative larger spot size of the expanded beam reduces the influence of contamination by dust and debris. Given physical contact between the end faces of the optical fibers 24 is not necessary, the durability of the mechanical interface between optical fiber connectors would increase. Lighter axial preload forces can be used since physical contact of opposing fiber end faces is not necessary. Furthermore, more misalignment between optical fiber connectors can be tolerated, since larger beam diameter permits more misalignment between connectors.

The cavity 19 could be left empty (i.e., filled with air), or it could be filled with a different material have a different refractive index (e.g., a polymer or epoxy that is index matched to the core of the optical fiber) to minimize reflections at the interfaces of the fiber ends. Filling the cavity 19 with another material has the additional benefits of preventing particles/dust from getting trapped in the cavity and preventing damages to the reflective surfaces R.

FIGS. 2A-2D illustrate coupling two ferrules with an alignment sleeve, in accordance with one embodiment of the present invention. The ferrules 12R and 12S each has an external surface for alignment with a complementary surface of an external alignment sleeve 20 (i.e., the internal surface of a generally cylindrical or tubular sleeve 20). The external surface of each ferrule is generally cylindrical, having a contact surface profile with a cross-section that is generally oval. Two similarly terminated optical fibers can be optically coupled end-to-end by the alignment sleeve, with two similar ferrules inserted into the alignment sleeve 20, with the reflective surfaces of the extended ends of the respective ferrule assemblies spaced apart and facing each other, in the manner shown in FIG. 1B.

Figure 2A:
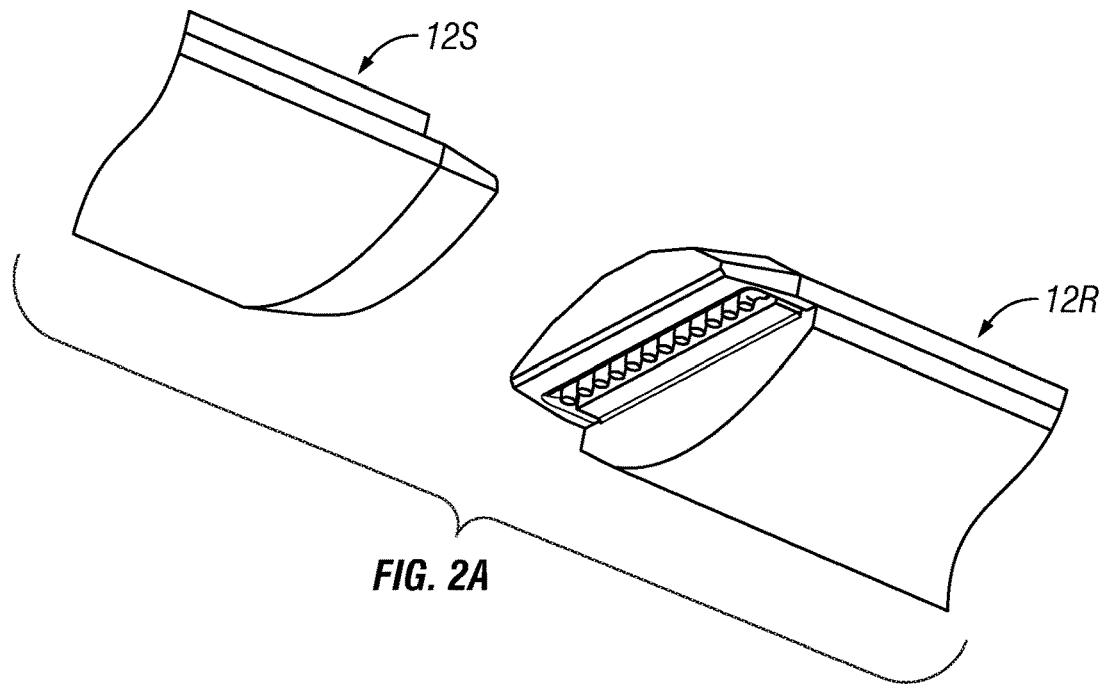
FIGS. 2A-2D illustrate coupling of two ferrules with an alignment sleeve, in accordance with one embodiment of the present invention.
Figure 2B:
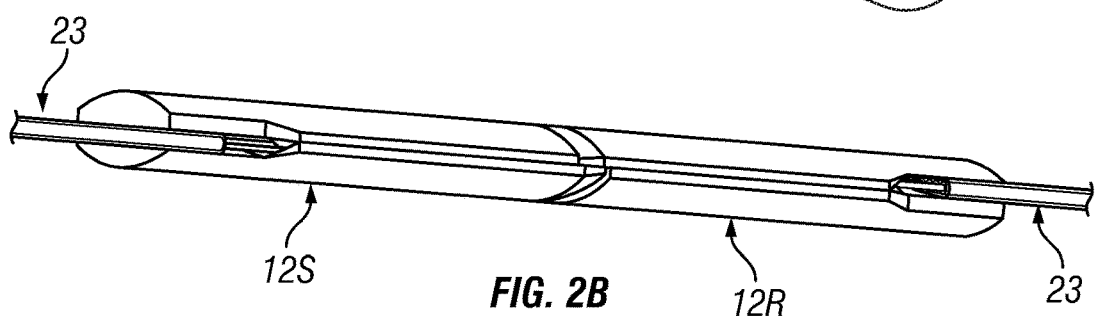
Figure 2C:
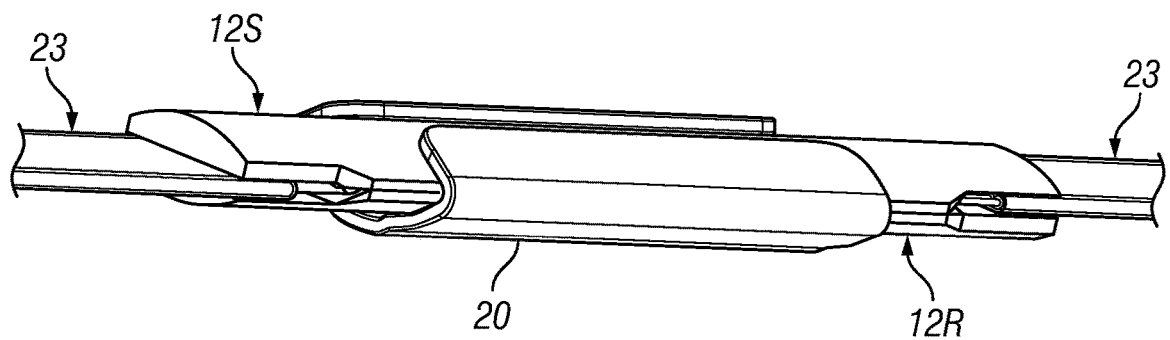
Figure 2D:
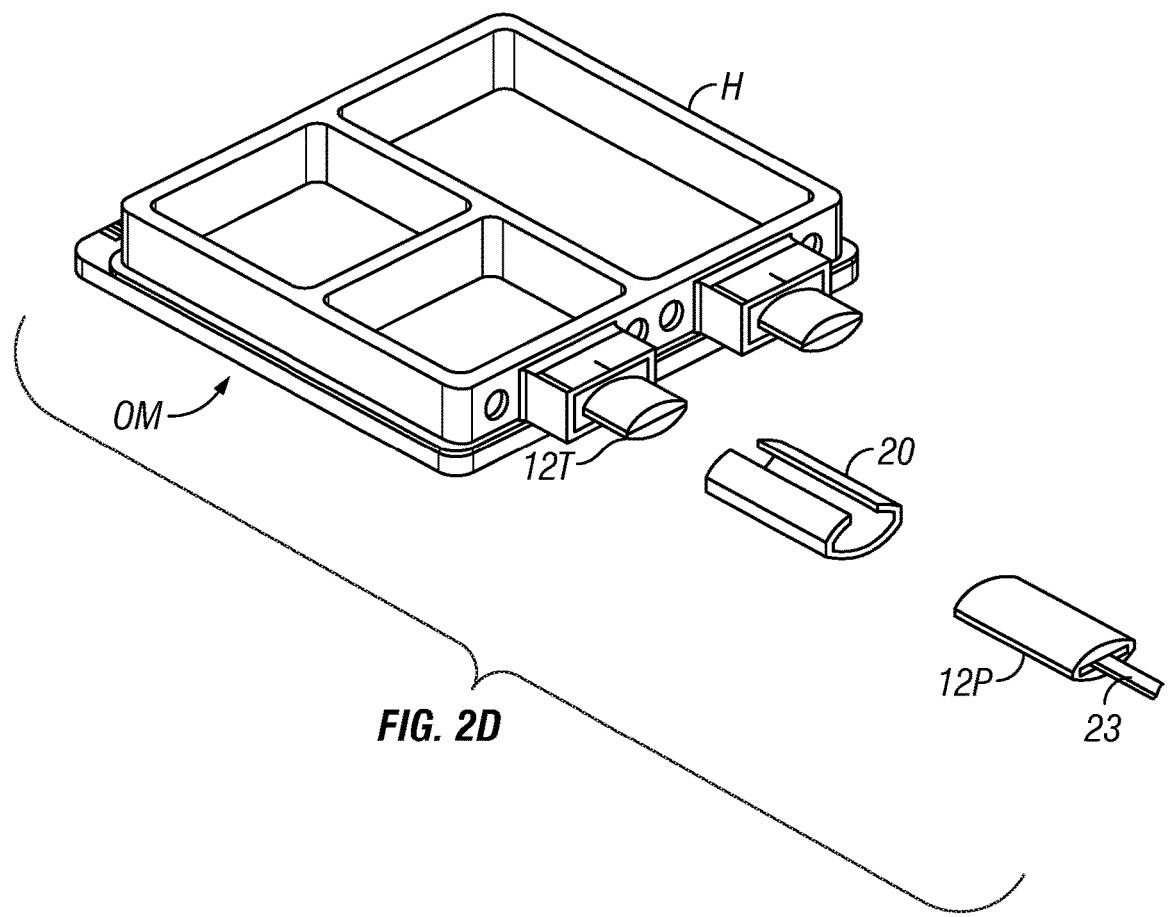

Referring to FIG. 2A, separate ferrules 12R and 12S are provided, which have at least similar external curved surface profiles for alignment sleeve 20, and similar reflective surfaces R having similar optical geometry. As shown in FIG. 2B, each ferrule (12R, 12S) terminates a plurality of optical fibers of a fiber cable ribbon 23. The ferrules 12R and 12S are coupled with the respective reflective surfaces R overlapping in a cross-sectional plane perpendicular to the longitudinal axis of the ferrules, conforming to the configuration shown in FIG. 1B. The sleeve 20 is not shown in FIG. 2B, but is shown in FIG. 2C. The ferrules 12R and 12S are aligned axially by the sleeve 20. The expanded light beam reflected between the ferrules are however at an angle (e.g., 90 degrees) to the longitudinal axis and to the mid-plane (mating plane) P of the ferrules. The mid-plane P of the ferrule 12 is also the mating plane of the ferrule halves 13 and 14 in each ferrule (12R, 12S). In this embodiment, the alignment sleeve 20 is a split sleeve, conforming to the exterior surface profile of the ferrules 12R and 12S. The alignment sleeve 20 aligns the optical fibers 24 by aligning the exterior surfaces of the ferrules 12R and 12S to achieve the relative position shown in FIG. 1B with the optical path L.

In another embodiment, an expanded beam ferrule disclosed above may be a demountable terminal ferrule 12T (i.e., a "pigtail") attached to an optical device (e.g., a housing H of a hermetically sealed optoelectronic module OM). An optical fiber ribbon 23 terminated with a similar expanded beam ferrule 12P (e.g., a patch cord) can be connected to the terminal ferrule 12T using an alignment sleeve 20 (e.g., a split sleeve having complementary shape sized to receive the ferrules 12T and 12P).

Various embodiments of the present invention incorporate some of the inventive concepts developed by the Assignee of the present invention, nanoPrecision Products, Inc., including various proprietary including optical bench subassemblies for use in connection with optical data transmissions, including the concepts disclosed in the patent publications discussed below, which have been commonly assigned to the Assignee.

For example, PCT Patent Application Publication No. WO2014/011283A2 discloses a ferrule for an optical fiber connector, which overcomes many of the drawbacks of the prior art ferrules and connectors, and further improves on the above noted pin-less alignment ferrules. The optical fiber connector includes an optical fiber ferrule, which has a generally oval cross-section for aligning an array of multiple optical fibers to optical fibers held in another ferrule using a sleeve.

U.S. Patent Application Publication No. US2013/0322818A1 discloses an optical coupling device for routing optical signals, which is in the form of an optical bench having a stamped structured surface for routing optical data signals. The optical bench comprising a metal base having a structured surface defined therein, wherein the structured surface has a surface profile that bends, reflects, and/or reshapes an incident light. The base further defines an alignment structure, which is configured with a surface feature to facilitate precisely positioning an optical component (e.g., an optical fiber) on the base in precise optical alignment with the structured surface to allow light to be transmitted along a defined path between the structured surface and the optical component, wherein the structured surface and the alignment structure are integrally defined on the base by stamping a malleable metal material to form an optical bench.

U.S. Patent Application Publication No. US2015/0355420A1 further discloses an optical coupling device for routing optical signals for use in an optical communications module, in particular an optical coupling device in the form of an optical bench, in which integrally defined on a metal base is a structured reflective surface having a surface profile that bends, reflects and/or reshapes an incident light. An alignment structure is defined on the base, configured with a surface feature to facilitate positioning an optical component (e.g., an optical fiber) on the base in optical alignment with the structured surface to allow light to be transmitted along a defined path between the structured surface and the optical component. The structured surface and the alignment structure are integrally defined on the base by stamping a malleable metal material of the base. The alignment structure facilitates passive alignment of the optical component on the base in optical alignment with the structured surface to allow light to be transmitted along a defined path between the structured surface and the optical component.

U.S. Patent Application Publication No. US2013/0294732A1 further discloses a hermetic optical fiber alignment assembly having an integrated optical element, in particular a hermetic optical fiber alignment assembly including an optical bench that comprises a metal ferrule portion having a plurality of grooves receiving the end sections of optical fibers, wherein the grooves define the location and orientation of the end sections with respect to the ferrule portion. The assembly includes an integrated optical element for coupling the input/output of an optical fiber to optoelectronic devices in an optoelectronic module. The optical element can be in the form of a structured reflective surface. The end of the optical fiber is at a defined distance to and aligned with the structured reflective surface. The structured reflective surfaces and the fiber alignment grooves can be formed by stamping a malleable metal to define those features on a metal base.

U.S. Pat. No. 7,343,770 discloses a novel precision stamping system for manufacturing small tolerance parts. Such inventive stamping system can be implemented in various stamping processes to produce the devices disclosed in the above-noted patent publications. These stamping processes involve stamping a stock material (e.g., a metal blank), to form the final overall geometry and geometry of the surface features at tight (i.e., small) tolerances, including reflective surfaces having a desired geometry in precise alignment with the other defined surface features.

U.S. Patent Application Publication No. US2016/0016218A1 further discloses a composite structure including a base having a main portion and an auxiliary portion of dissimilar metallic materials. The base and the auxiliary portion are shaped by stamping. As the auxiliary portion is stamped, it interlocks with the base, and at the same time forming the desired structured features on the auxiliary portion, such as a structured reflective surface, optical fiber alignment features, etc. With this approach, relatively less critical structured features can be shaped on the bulk of the base with less effort to maintain a relatively larger tolerance, while the relatively more critical structured features on the auxiliary portion are more precisely shaped with further considerations to define dimensions, geometries and/or finishes at relatively smaller tolerances. The auxiliary portion may include a further composite structure of two dissimilar metallic materials associated with different properties for stamping different structured features. This stamping approach improves on the earlier stamping process in U.S. Pat. No. 7,343,770, in which the stock material that is subjected to stamping is a homogenous material (e.g., a strip of metal, such as Kovar, aluminum, etc.) The stamping process produces structural features out of the single homogeneous material. Thus, different features would share the properties of the material, which may not be optimized for one or more features. For example, a material that has a property suitable for stamping an alignment feature may not possess a property that is suitable for stamping a reflective surface feature having the best light reflective efficiency to reduce optical signal losses.

The above inventive concepts are incorporated by reference herein, and will be referred below to facilitate disclosure of the present invention.

FIGS. 3A-3K illustrate various views of a ferrule 12 for use within an optical fiber connector 10 (see FIG. 7C), in accordance with one embodiment of the present invention. The ferrule 12 comprising two ferrule halves 13 and 14 supporting an array of optical fibers 24 of an optical fiber ribbon 23. The structures of the ferrule halves 13 and 14 will be explained in greater detail below in connection with FIGS. 4 and 5. The ferrule 12 has an overall generally cylindrical body, having a generally oval shaped cross-section (see FIG. 3F, which is an end view of the ferrule 12 from the ribbon 23 end; and FIG. 3G, which is an end view of the ferrule 12 from its free distal end.) It is noted that in the sectional views shown in FIGS. 3F and 3G, the lateral sides 40 of the ferrule 12 are truncated with a generally flat surface or a surface with a substantially larger radius of curvature.

Reference is made to PCT Patent Application Publication No. WO2014/011283A2 (which has been incorporated by reference herein), which discloses an optical fiber connector that includes an optical fiber ferrule, which has a generally oval cross-section for aligning an array of multiple optical fibers to optical fibers held in another ferrule using a sleeve. However, such disclosure does not utilize an expanded beam for optical coupling of the optical fibers held in ferrules. In the present invention, the inventive ferrule 12 includes an integrated reflective surface to implement an expanded beam.

Figure 3A:
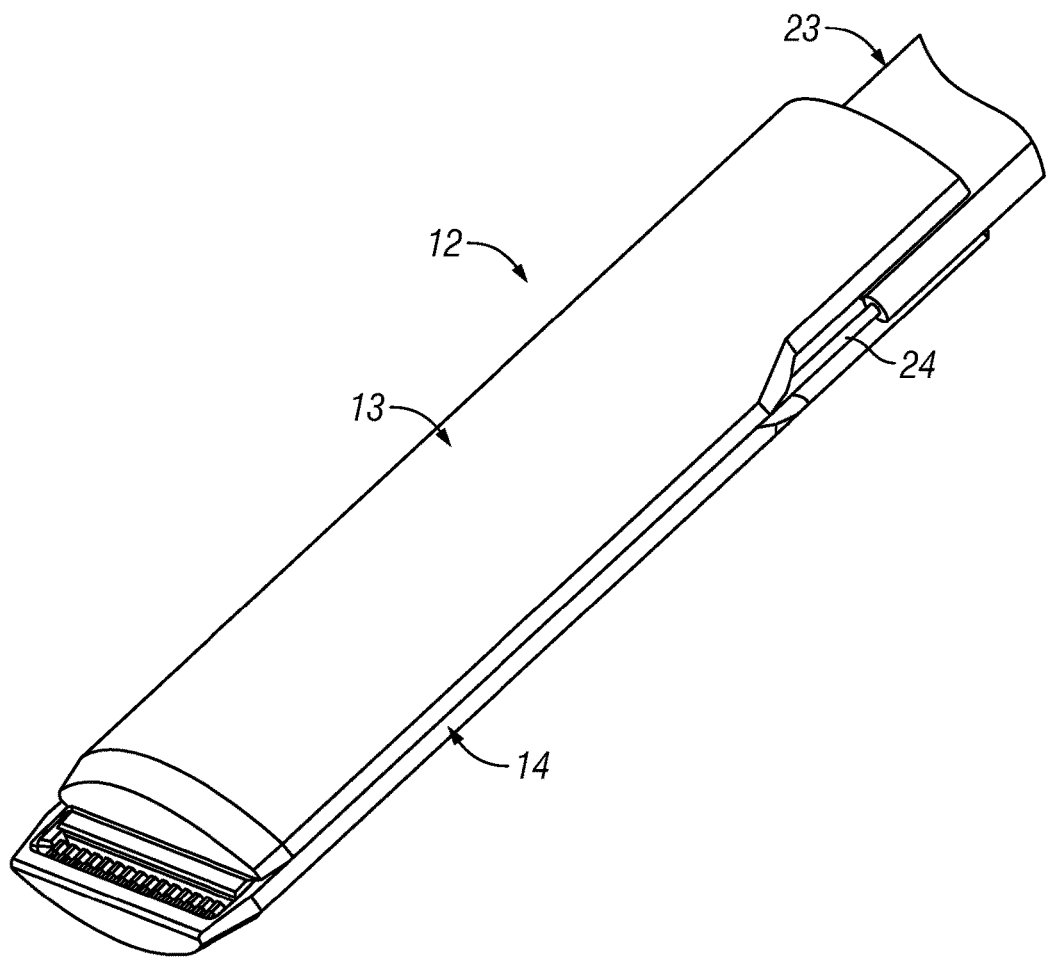
FIGS. 3A-3K illustrate various views of an optical fiber ferrule assembly in accordance with one embodiment of the present invention.
Figure 3B:
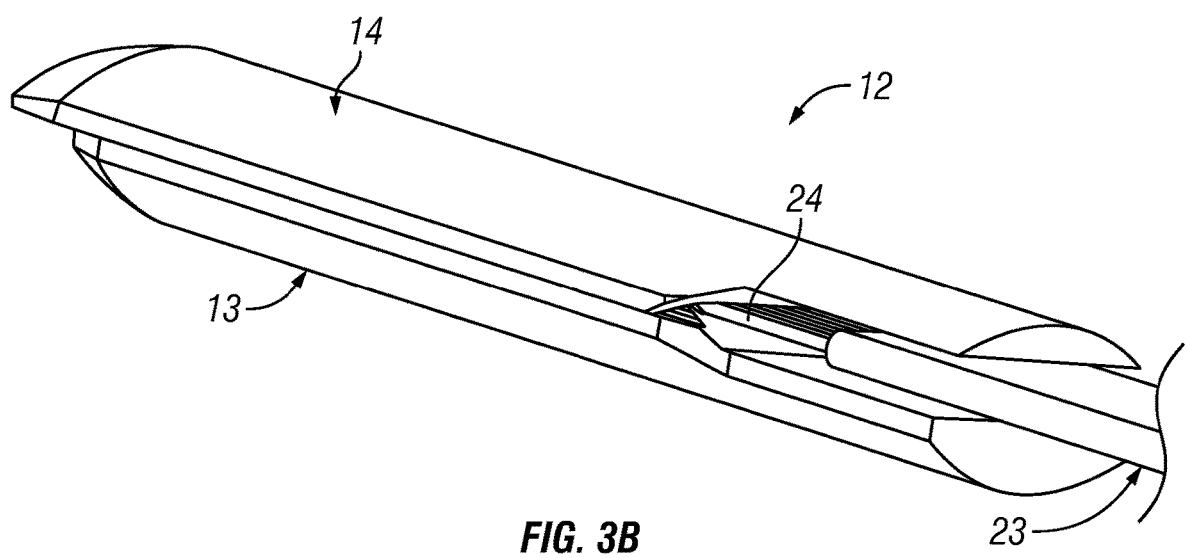
Figure 3C:
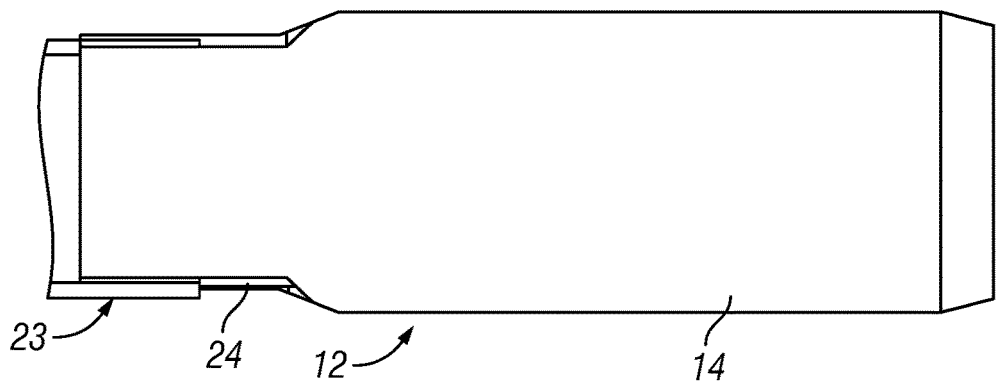
Figure 3D:
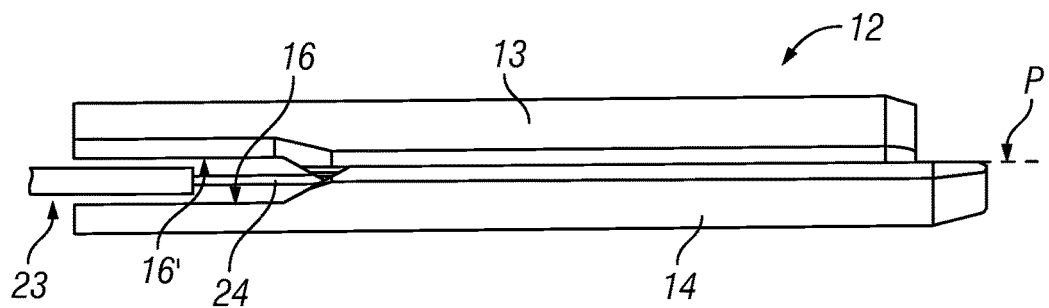
Figure 3E:
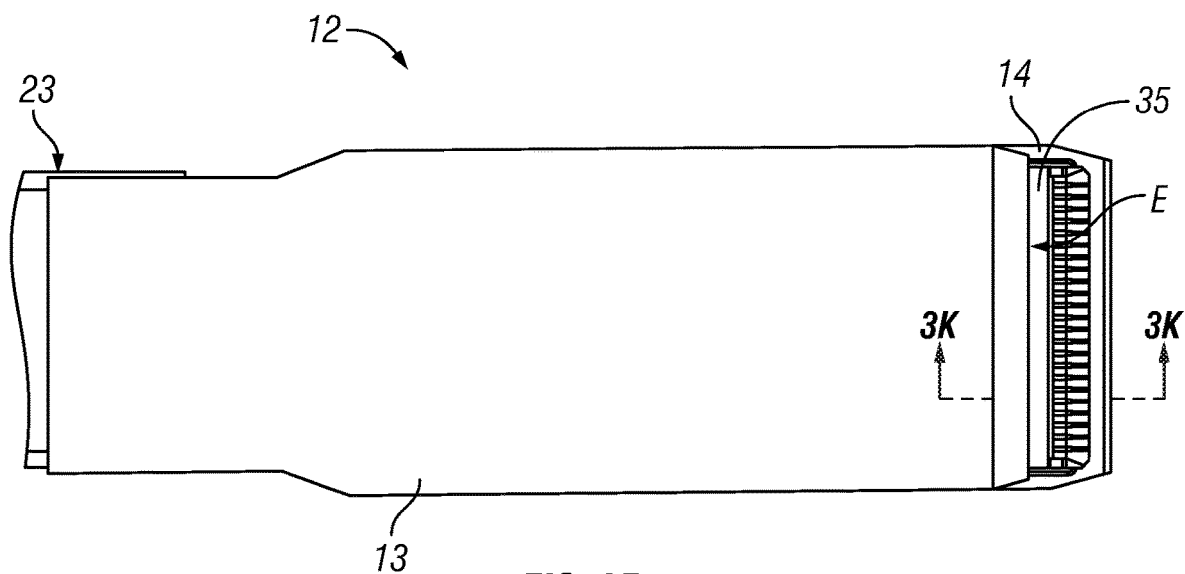
Figure 3F:
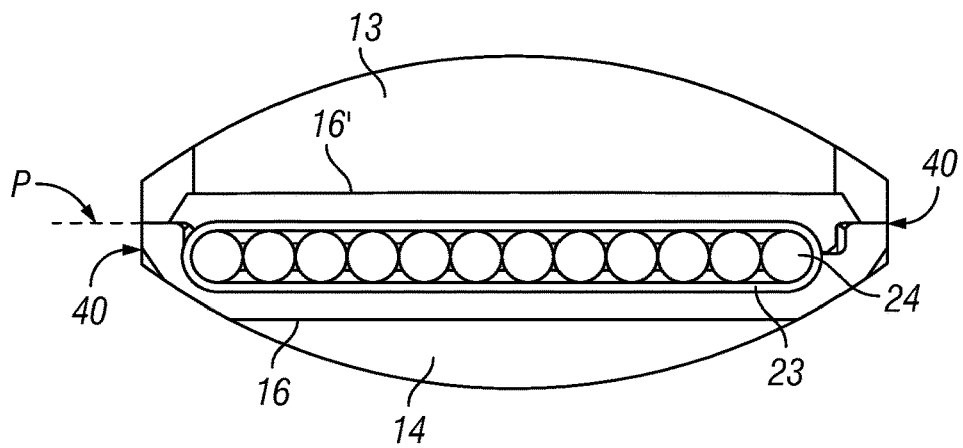
Figure 3G:
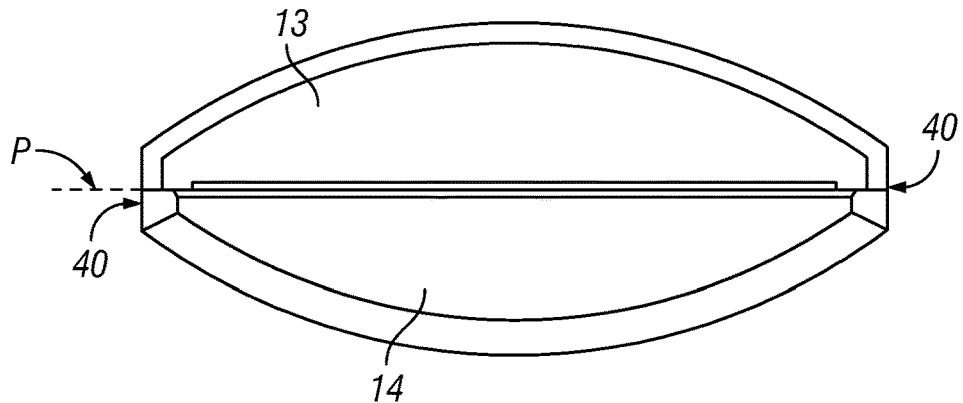
Figure 3H:
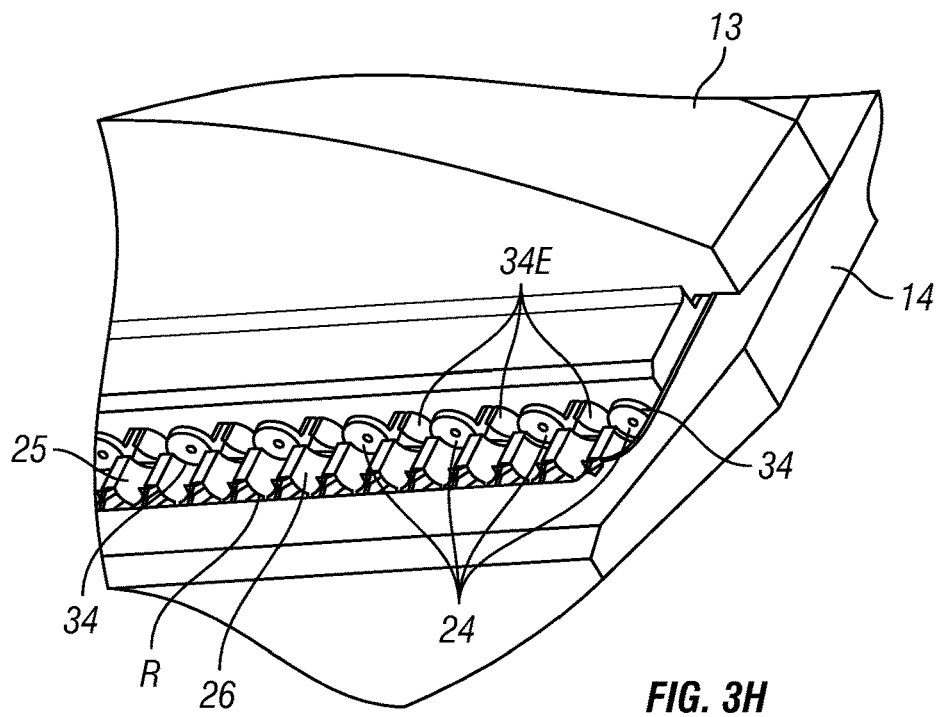
Figure 3I:
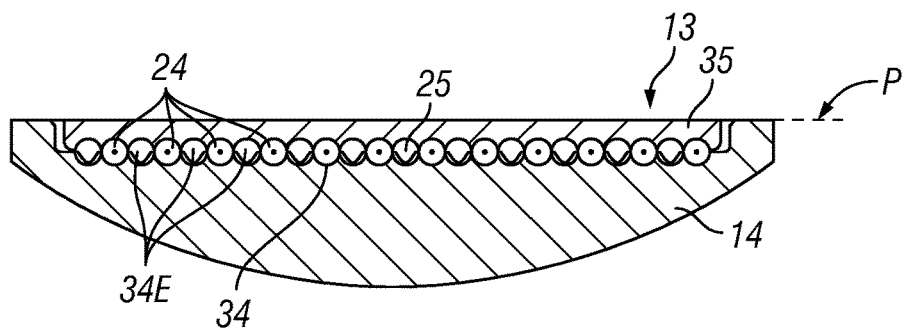
Figure 3J:
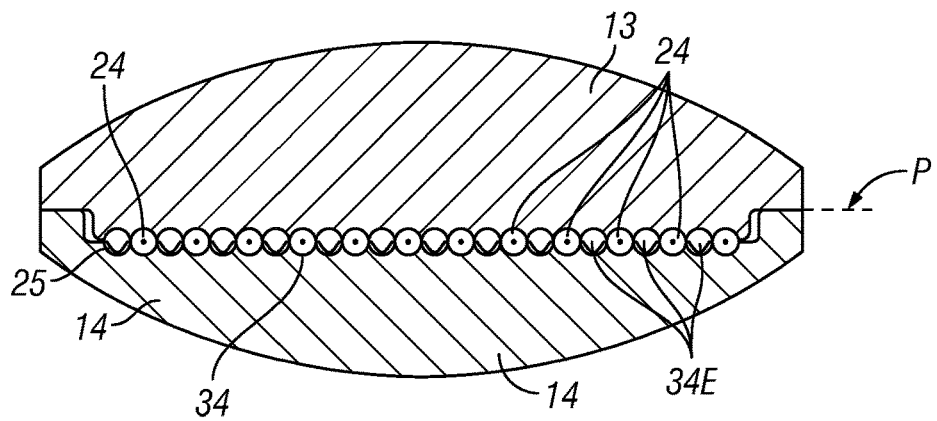
Figure 3K:
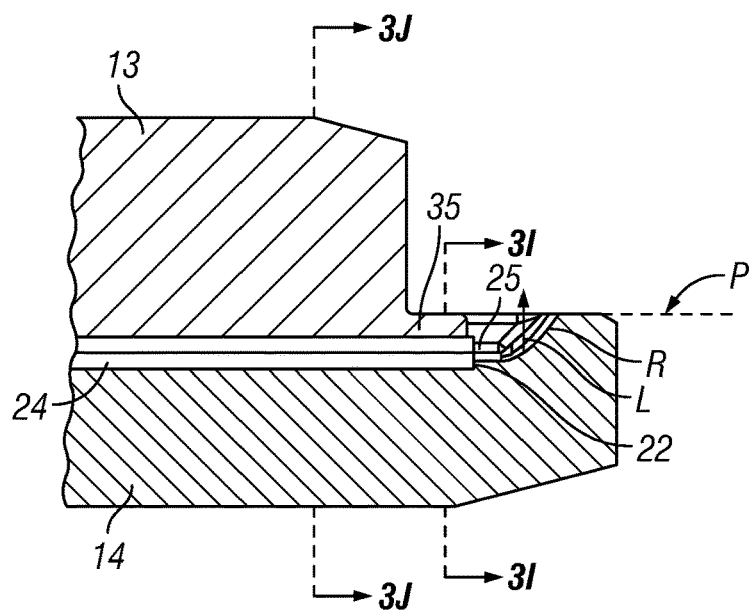

Referring to FIGS. 3H and 3K (which is a sectional view taken along line 3K-3K in FIG. 3E), in the illustrated embodiment, the ferrule 12 is configured to retain and align a plurality of optical fibers 24, with an array of a plurality of integrated reflective surfaces R provided on the ferrule halve 14, each corresponding to one optical fiber 24. The end of the ferrule halve 14 extend with the reflective surface R beyond the distal end of the complementary ferrule halve 13 (i.e., beyond the free end of the ferrule halve 13, opposite to the other end from which the fiber cable 23 extends). The array of reflective surfaces R is located near the distal end of the ferrule halve 14, beyond the end face 22 of the optical fiber 24. The end face 22 of each optical fiber 24 is located at a defined distance (with the edge of the end face 22 butting against a stop 25 provided at the defined distance from the reflective surface R; see also FIG. 4H discussed below) to and aligned with its corresponding reflective surface R. Each reflective surface R directs light to/from the input/output end 22 of each optical fiber 24 by reflection, to turn light with respect to the optical axis of the optical fiber 24 held in the ferrule 12. In one embodiment, each reflective surface R turns light by 90 degrees (see FIG. 1B).

FIGS. 4A-4I illustrate various views of a ferrule halve having a reflective surface in the optical fiber ferrule assembly in FIG. 3, in accordance with one embodiment of the present invention. The ferrule halve 14 is provided with a curved exterior surface 15 (generally conforming to one half of an overall oval cross-section), and an interior fiber alignment structure, comprising a plurality of parallel, longitudinal, open grooves 34 is provided on the inside surface 39 of the body of the ferrule halve 14 (the surface facing the other ferrule halve 13). The grooves 34 facilitate passive optical alignment of the optical fibers 24 with respect to the respective reflective surfaces R to allow light to be transmitted along a defined path between the reflective surfaces and the optical fibers 24. In the illustrated embodiment, the grooves 34 are shown as semi-circular in cross-section. However, grooves having V-shaped cross-section may also be used instead. Each integrated reflective surface R is an integral extension from an alignment groove 34 in the ferrule halve 14.

In the illustrated embodiment, each reflective surface R is an opaque free surface facing away from the opaque body of the ferrule halve 14. The free surface is exposed to the exterior (e.g., air or an index matching material), and reflecting incident light directed at the free surface from the exterior side (i.e., the incident light is not directed through the opaque body of the ferrule halve 14). Each reflective surface R is structured with a reflective geometry that bends (i.e., turns or folds) and reshapes (i.e. collimates) output light from the end face 22 of the optical fiber 24 held in the grooves 34 of ferrule halve 14 (or in reverse, bends and reshapes (i.e., focuses) external collimated light incident at the reflective surface R at the end face 22 of the optical fiber 24). In one embodiment, the reflective surface R is structured to be concave reflective (e.g., an aspherical mirror surface). The structured reflective surface R is optically aligned with the optical axis of the optical fiber 24 along the desired optical path L, with the end face 22 of the optical fiber 24 located at a desired distance from the reflective surface R for the desired level of beam expansion. The diameter/spot size of the collimated expanded beam is related to the distance along the optical path L between the end face 22 of the optical fiber 24 and the reflective surface R.

Figure 4A:
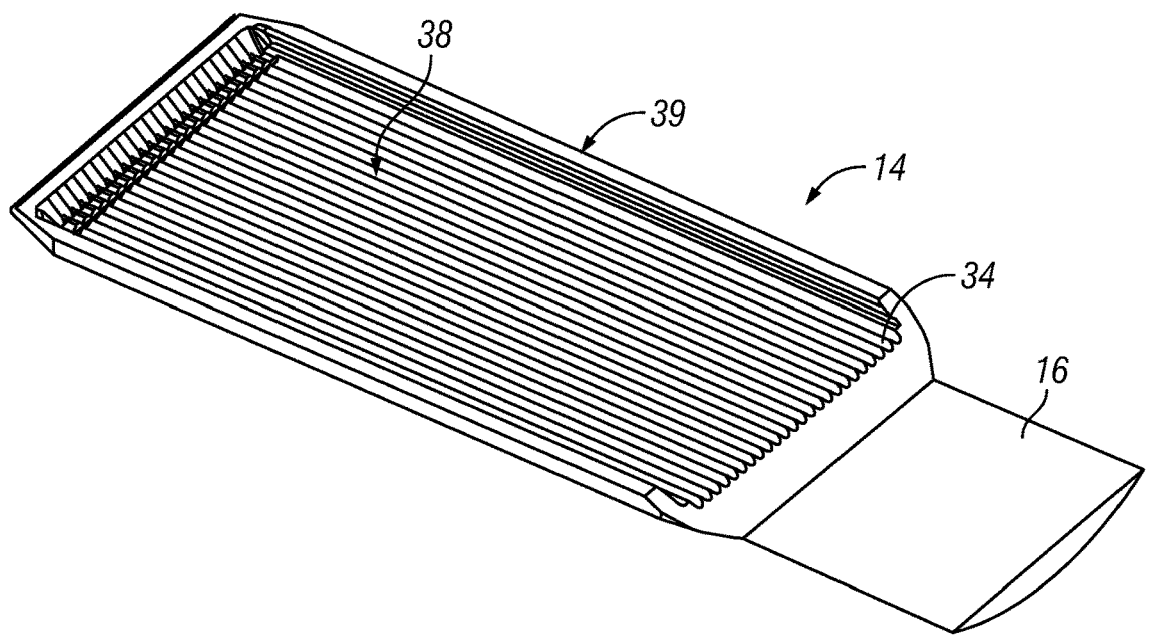
FIGS. 4A-4I illustrate various views of a ferrule halve having a reflective surface in the optical fiber ferrule assembly in FIG. 3, in accordance with one embodiment of the present invention.
Figure 4B:
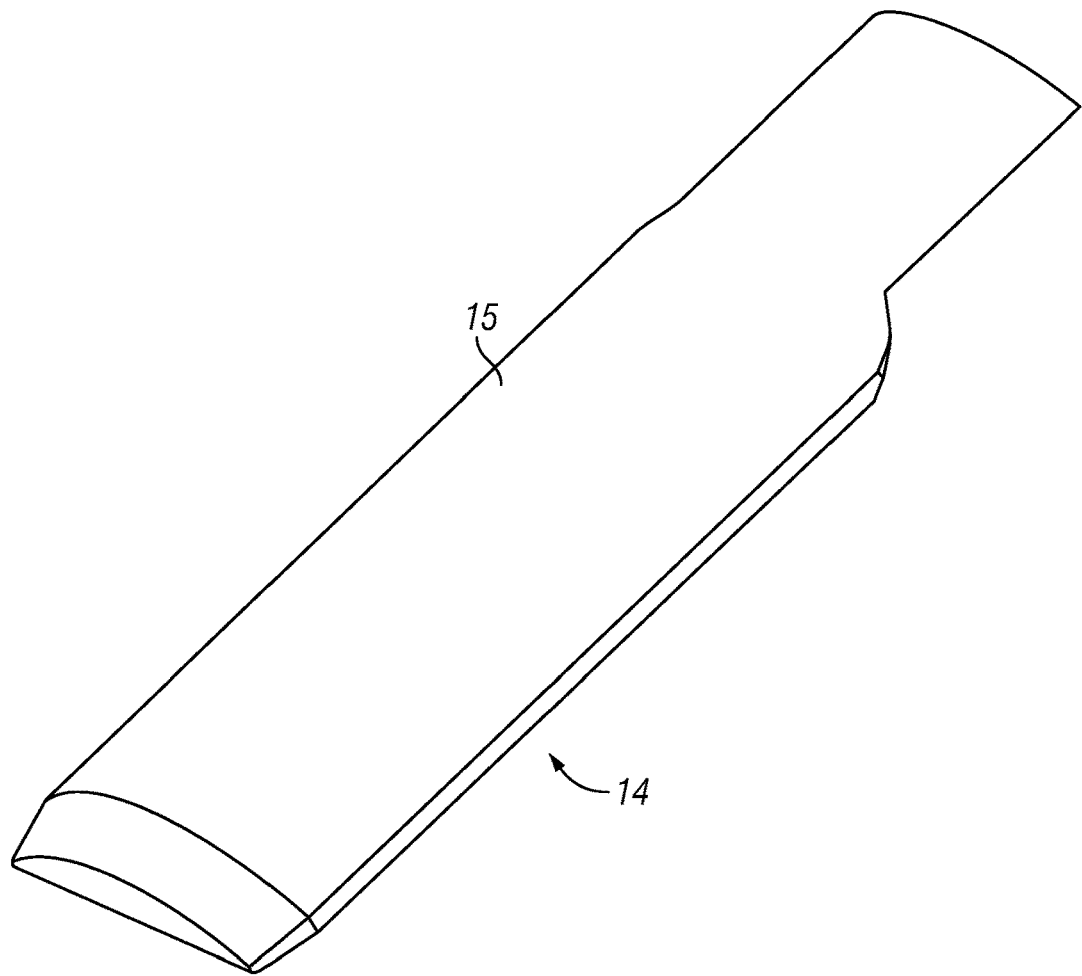
Figure 4C:
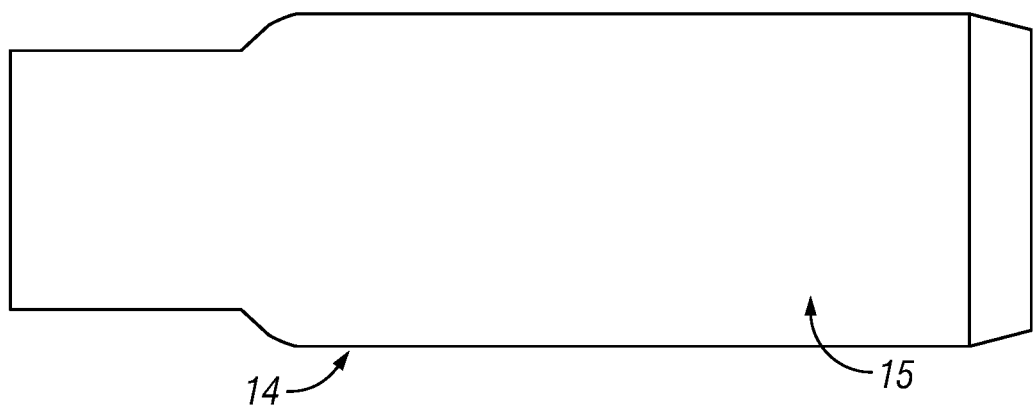
Figure 4D:
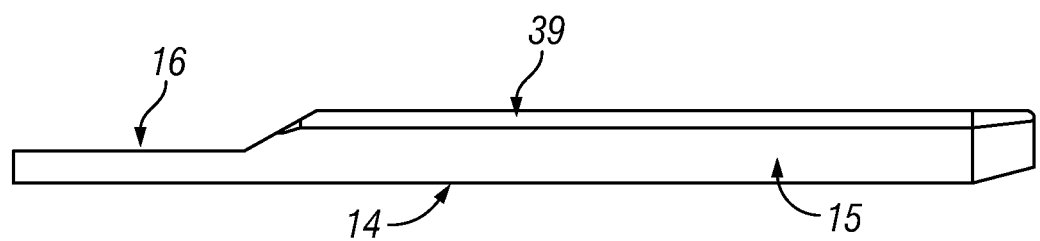
Figure 4E:
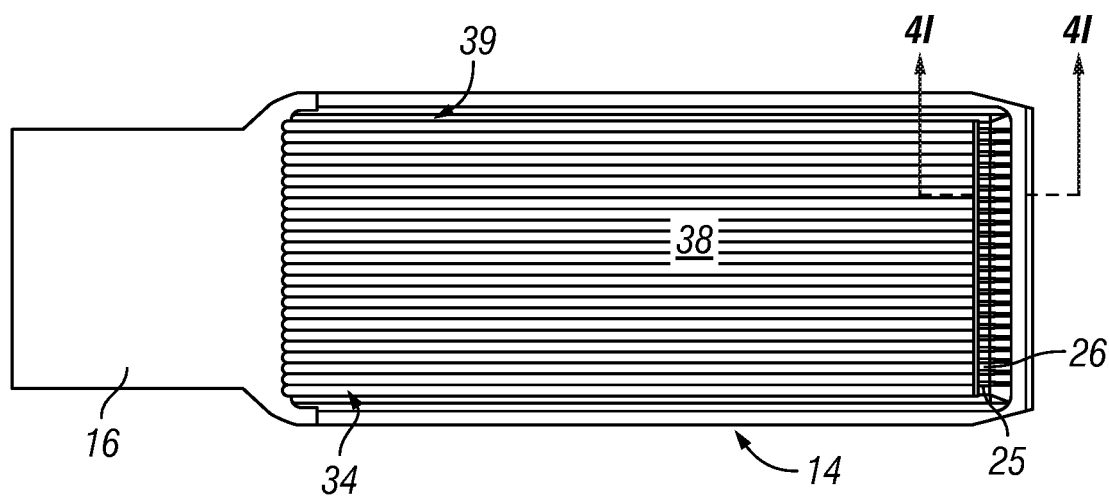
Figure 4F:
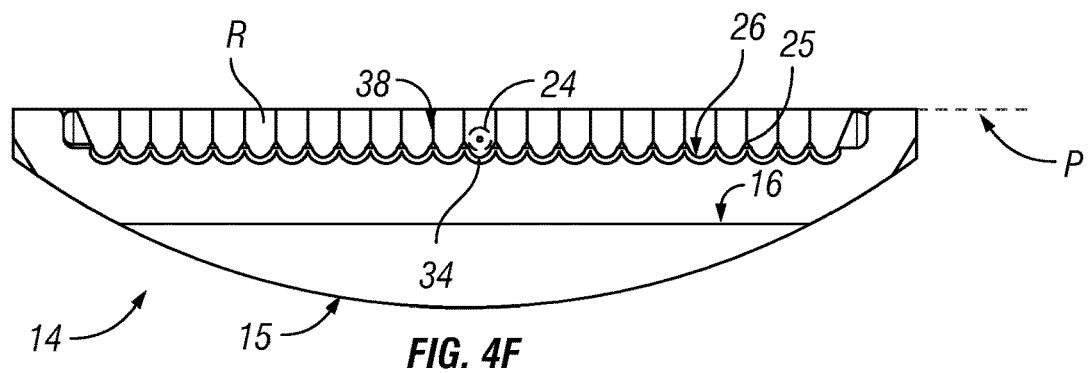
Figure 4G:
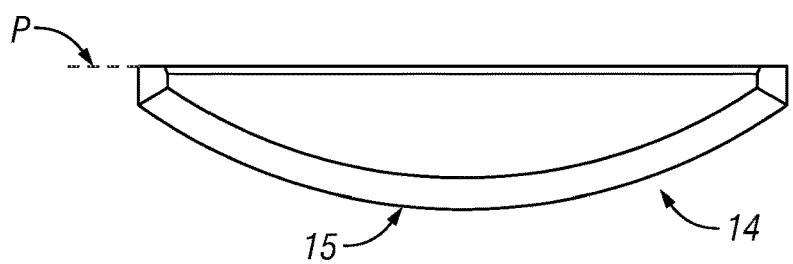
Figure 4H:
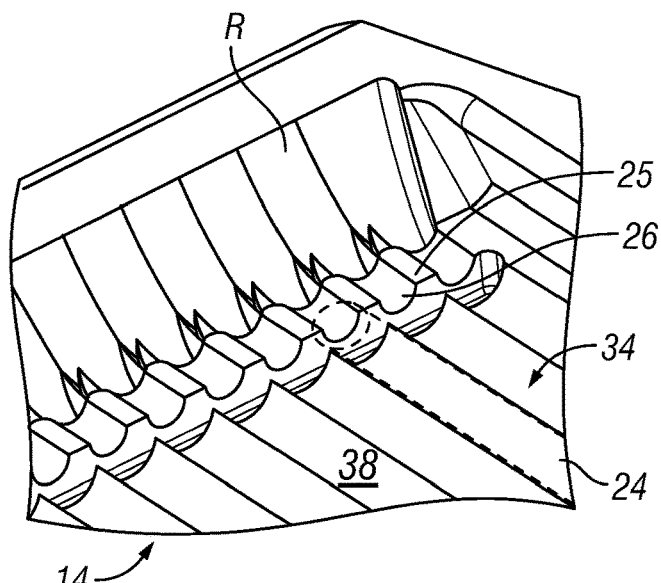
Figure 4I:
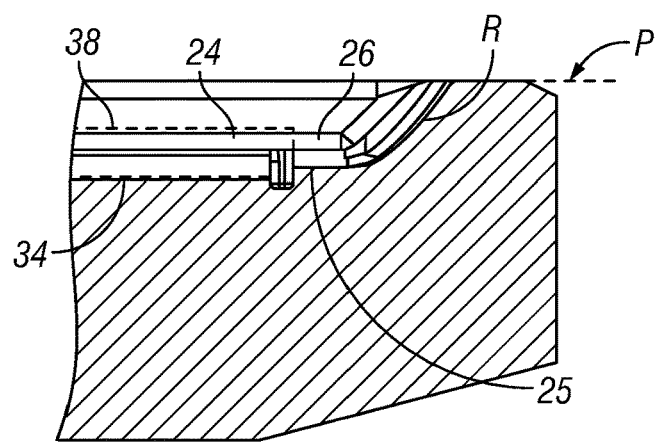

Referring to the close-up view of FIG. 4H and the sectional view of FIG. 4I (taken alone line 4I-4I in FIG. 4E), a stop 25 is provided to define the location of the end face 22 of each optical fiber 24 at a predetermined distance from the corresponding reflective surface R. The stop 25 is structured with short grooves 26 (e.g., of semi-circular cross-section) having a width slightly smaller than width of the fiber grooves 34. The stop 25 provides a defined limit which the end faces of the 22 of the optical fibers 24 can butt against, but allow light to pass between the optical fibers 34 and the respective reflective surfaces R through the grooves 26 in the stop 25. FIG. 3I illustrates more clearly the end faces 22 of the optical fibers 24 butting against the stop 25. In FIGS. 4H and 4I, a single optical fiber 24 is depicted by in phantom by dotted lines. As shown in FIG. 4I, a cavity 38 is provided in the surface 39 of the ferrule halve 14. The grooves 34 are provided within the cavity 38, and are recessed below the mating plane P (which is the contact plane P with opposing ferrule halve 13, and is also the mid-plane P of the overall ferrule 12 shown in FIG. 3), and the cylindrical body of the optical fiber 24 does not protrude above the mating plane P. Accordingly, the centerline (optical axis) of the optical fiber 24 is offset from (i.e., below) and parallel to the plane P (as was the case in FIG. 1B). The mating plane P of the ferrule halve 14 is also the plane through which light emerges/enters the ferrules halve 14.

As shown in FIG. 4A, a platform 16 is provided at the fiber cable end of the ferrule halve 14. The side view of FIG. 4D (as well as the end view of FIG. 4F) illustrates the space defined at the region of the platform 16, which, in combination with a similar space defined at the complementary ferrule halve 13 discussed further below, would provide an overall space to accommodate the thickness of the fiber ribbon 24, as shown in the assembled ferrule 12 in FIG. 3D.

The ferrule halve 14 having the open structure of the reflective surfaces R and the fiber alignment grooves 34 lends itself to mass fabrication processes such as precision stamping. The present invention adopts the concept of stamping optical elements disclosed in U.S. Patent Application Publication No. US2013/0322818A, and U.S. Patent Application Publication No. US2015/0355420A1, which have been fully incorporated by reference herein. These patent publications disclose integrally defining by stamping a malleable metal material to integrally and simultaneously form reflective surfaces and fiber alignment grooves by stamping a malleable metal material (i.e., a stock metal material or metal blank).

In one embodiment, the various structures and features of the ferrule halve 14 are formed by stamping. Specifically, the ferrule halve 14 is formed by stamping a malleable metal material to integrally and simultaneously define the exterior curved surface 15, the platform 16, and the features on the interior surface 39 (including the grooves 34, the stops 25, and the reflective surfaces R). Effectively, a one-piece open ferrule halve 14 can be produced to support the optical fibers 24 with their ends in precise location and alignment with respect to the reflective surfaces R, and further in alignment to the external geometry of the ferrule halve 14 as well as to the features of the other ferrule halve 13 (which will be explained below, which can also be formed by similar stamping processes). In the present invention, the contact between the alignment sleeve 20 and the ferrule 12 (including the ferrules halves 13 and 14) and the contact between the ends of the ferrules aligned with the alignment sleeve 20 contribute to and define the alignment of the optical fibers and the reflective surfaces R in the ferrule 12 with respect to another similar ferrule 12, as was in the case of ferrules 12R and 12S aligned by a sleeve 20 in FIG. 2.

FIGS. 5A-5H illustrate various views of a complementary ferrule halve in the optical fiber ferrule assembly in FIG. 3, in accordance with one embodiment of the present invention. The ferrule halve 13 has a simpler structure as compared to that of the ferrule halve 14 discussed above, though the ferrule halve 13 shares some of the structural features of the ferrule halve 14. Notably, the ferrule halve 13 does not include reflective surface R and the fiber stop 25.

As with the ferrule halve 14, the ferrule halve 13 is provided with a similar curved exterior surface 15' (generally conforming to one half of an overall oval cross-section), and an interior fiber alignment structure, comprising a plurality of parallel, longitudinal, open grooves 34' is provided on the inside surface 39' of the body of the ferrule halve 13 (the surface facing the other ferrule halve 14). The fiber grooves 34' (similar to the grooves 34 in the ferrule halve 34) are complementary to the grooves 34 in ferrule halve 14, which together the grooves 34 and 34' align optical fiber 24.

Figure 5A:
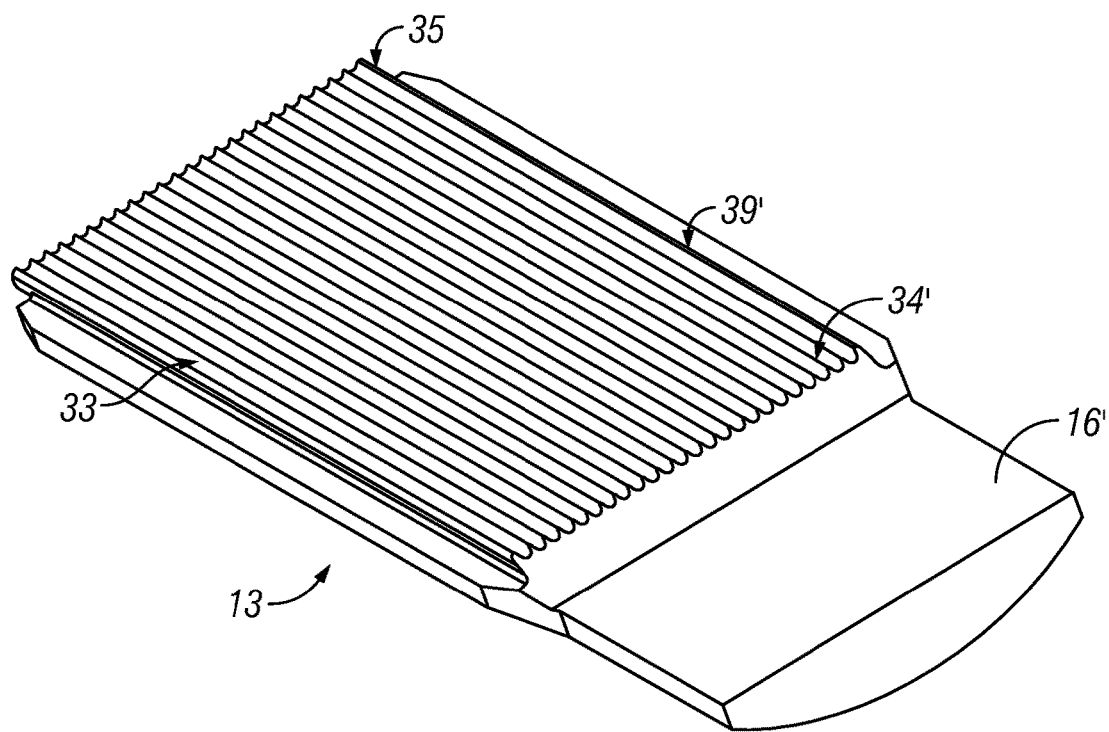
FIGS. 5A-5H illustrate various views of a complementary ferrule halve in the optical fiber ferrule assembly in FIG. 3, in accordance with one embodiment of the present invention.
Figure 5B:
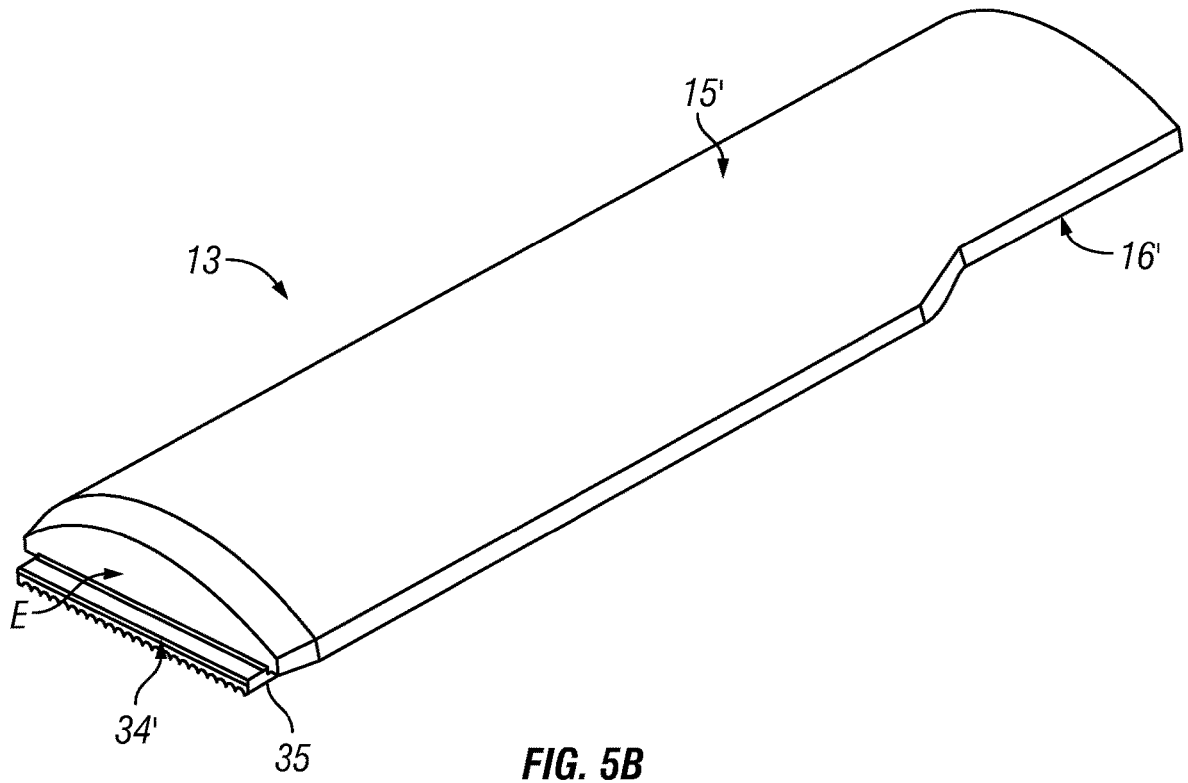
Figure 5C:
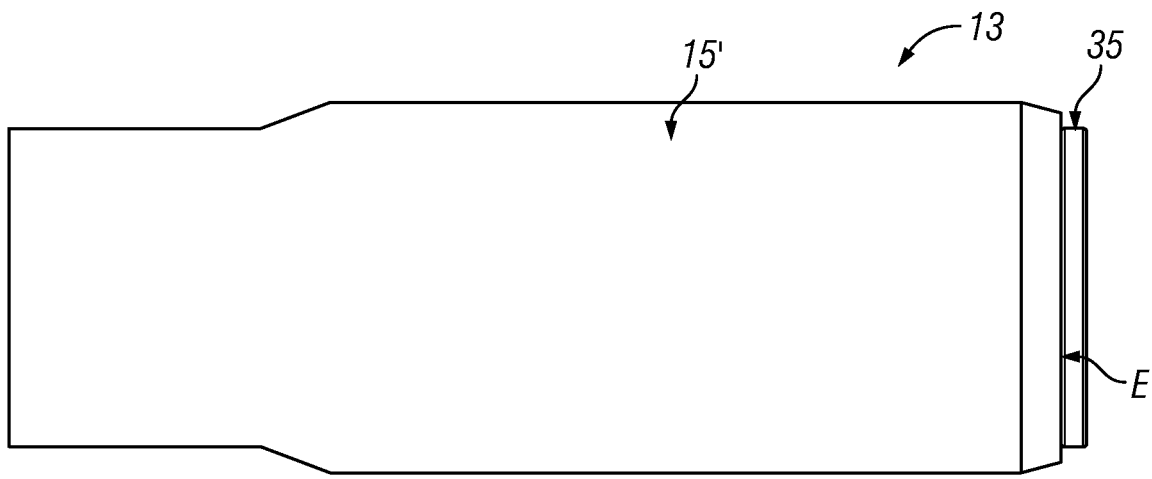
Figure 5D:
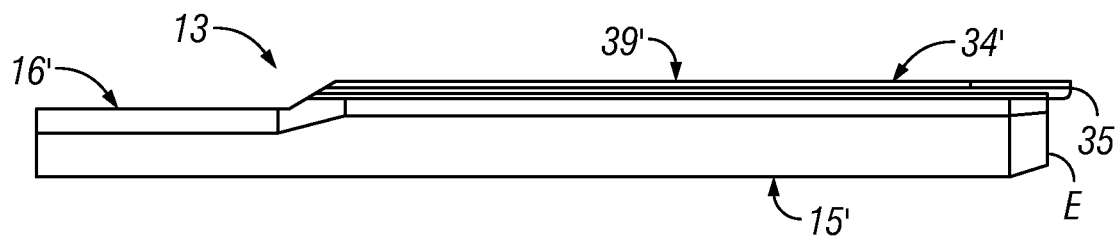
Figure 5E:
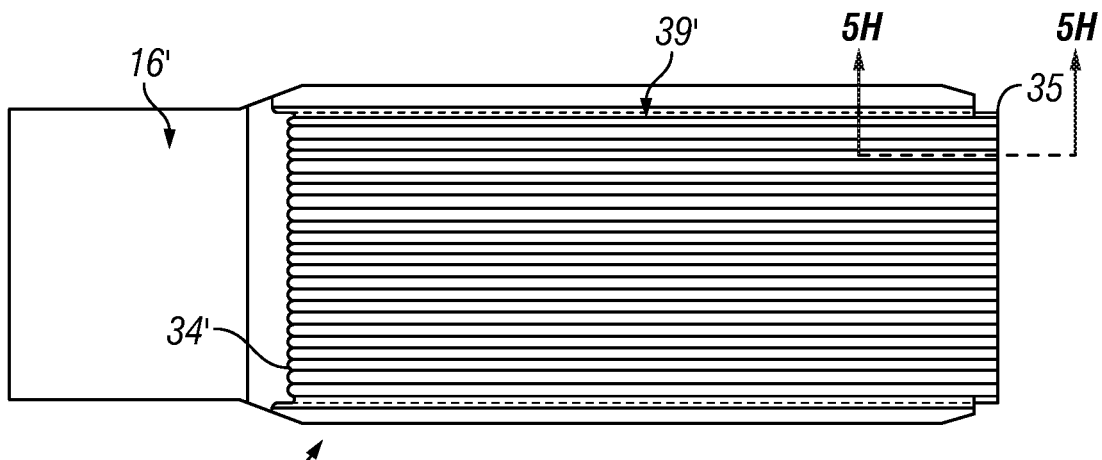
Figure 5F:
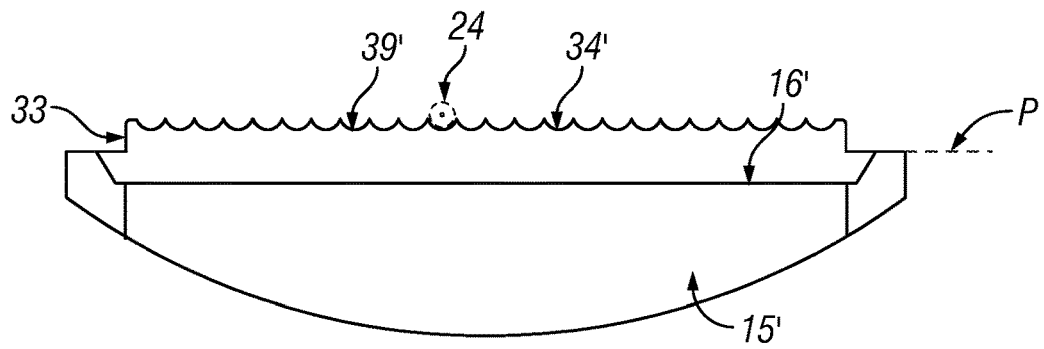
Figure 5G:
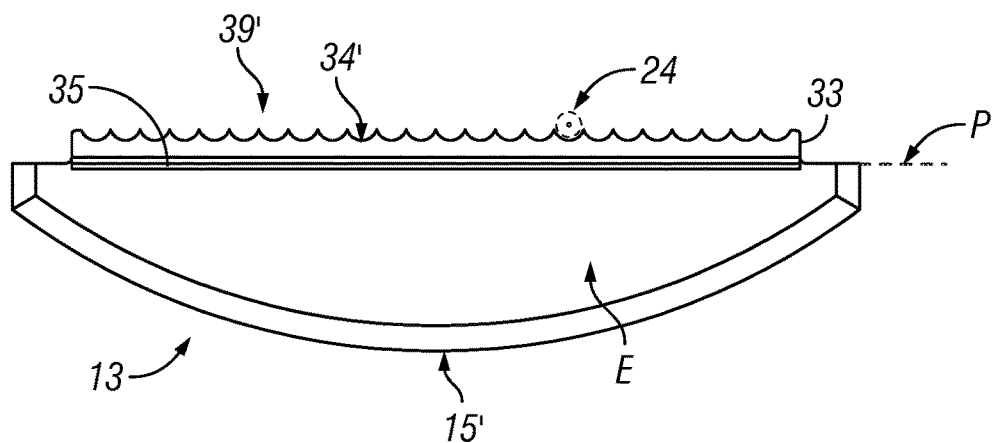
Figure 5H:
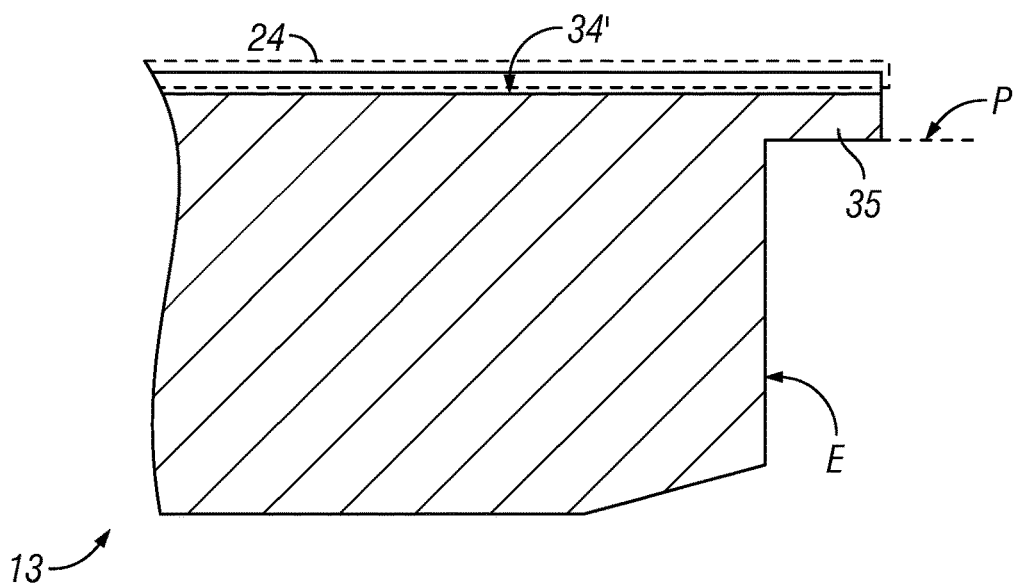

Referring to the end view of FIGS. 5F and 5G, and the sectional view FIG. 5H (taken along line 5H-5H in FIG. 5E), the interior surface 39' at which the grooves 34' are defined are raised above the mating plane P (raised portion 33). This is necessary since the grooves 34 in the opposing ferrule halve 14 are below the mating plane P, as discussed above. As shown in FIG. 5H, the grooves 34' is raised above the mating plane P, which is the contact plane P with opposing ferrule halve 13, and corresponds to the mid-plane P of the overall ferrule 12 shown in FIG. 3. The mating plane P of the ferrule halve 13 is also the plane through which light emerges/enters the ferrule 12.

In the illustrated embodiment, the ferrule halve 13 includes a cover portion 35 that extends from the end face E of the ferrule halve 13. As shown in the sectional view of FIG. 5H, the cover portion 35 has a thickness that accommodates the grooves 34'. Referring also to the sectional view of FIG. 3K and the embodiment of FIG. 1B (ferrules 12R and 12S), with the ferrule halve 13 of ferrule 12R mated to the ferrule halve 14 of ferrule 12R, the end face E of the ferrule halve 13 of ferrule 12R is recessed from the cover portion 35 of ferrule 12R, to accommodate the distal end of the ferrule halve 14 of ferrule 12S, with the cover portion 35 of ferrule 12R covering the optical fibers 24 in the ferrule 12R, to securely retain and align the ends of the optical fibers 24 to reflective surfaces R in the ferrule 12R. Similarly, with the ferrule halve 13 of ferrule 12S mated to the ferrule halve 14 of ferrule 12S, the end face E of the ferrule halve 13 of ferrule 12S is recessed from the cover portion 35 of ferrule 12S, to accommodate the distal end of the ferrule halve 14 of ferrule 12R, with the cover portion 35 of ferrule 12S covering the optical fibers 24 in the ferrule 12S, to securely retain and align the ends of the optical fibers 24 to the reflective surfaces R in the ferrule 12S.

As further shown in FIG. 3K, the cover portion 35 is completely received in the ferrule halve 14, with the raised portion 33 of the ferrule halve 13 received completely within the cavity 38 in the surface 39 of the ferrule halve 14, so that the cover portion 35 does not protrude above (e.g., flush with) the mating plane (or ferrule mid-plane) P, so as not to block access by the distal end of the other ferrule halve. The width of the raised portion 33 of the ferrule halve 13 is similar to (or within acceptable tolerance, slightly less than) the width of the cavity 38 of the ferrule halve 14, so that the raised portion 33 can fit in the cavity 38 with little or no play. In effect, the raised portion 33 and the cavity 38 provides a mean of aligning the ferrules halves 13 and 14 (at least in the cross-sectional plane perpendicular to the axis of the ferrule 12), so that the grooves 34 and 34' match up, and the exterior curved surfaces 15 and 15' of the ferrule halves forming the desired generally oval sectional profile.

As was in the ferrule halve 14, a platform 16' is provided at the fiber cable end of the ferrule halve 13. The side view of FIG. 5D (as well as the end view of FIG. 5H) illustrates the space defined at the region of the platform 16', which, in combination with a similar space defined at the complementary ferrule halve 14 discussed above, would provide an overall space to accommodate the thickness of the fiber ribbon 23, as shown in the assembled ferrule 12 in FIG. 3D.

With the ferrule halves 13 and 14 assembled together with the optical fiber ribbon 23, with the ferrule halves 13 and 14 are mated along the mating plane P, the optical fibers 24 are sandwiched between the respective pairs of complementary grooves 34 and 34', thereby forming the ferrule 12 shown in FIG. 3.

FIGS. 3 to 5 illustrate the ferrule accommodating a single fiber ribbon 23 having an array of twelve optical fibers 24. However, the ferrule 12 is structured to accommodate a maximum of twenty-four optical fibers 24. There is an array of twenty-four grooves (34, 34') respectively provided in the ferrule halve 13 and 14. As more clearly shown in FIGS. 3H, 3I and 3J, the twelve optical fibers 24 are positioned in alternate grooves, with an empty groove 34E between adjacent fibers.

Figure 6A:
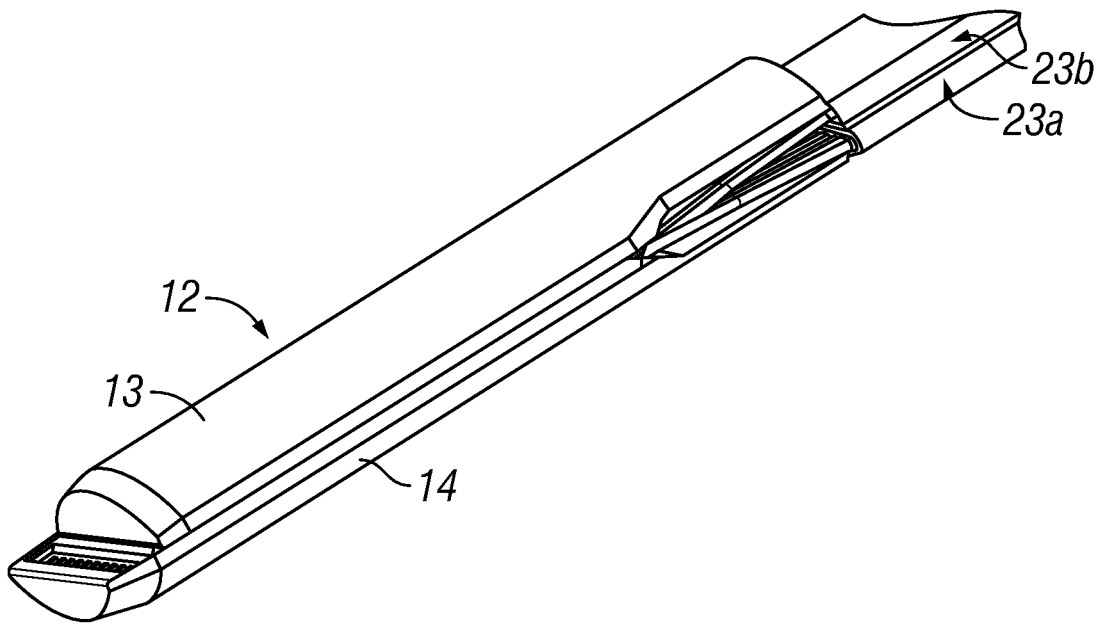
FIGS. 6A-6E illustrate various views of the optical fiber ferrule assembly in FIG. 3, interlacing optical fibers from two optical fiber cables, in accordance with one embodiment of the present invention.
Figure 6B:
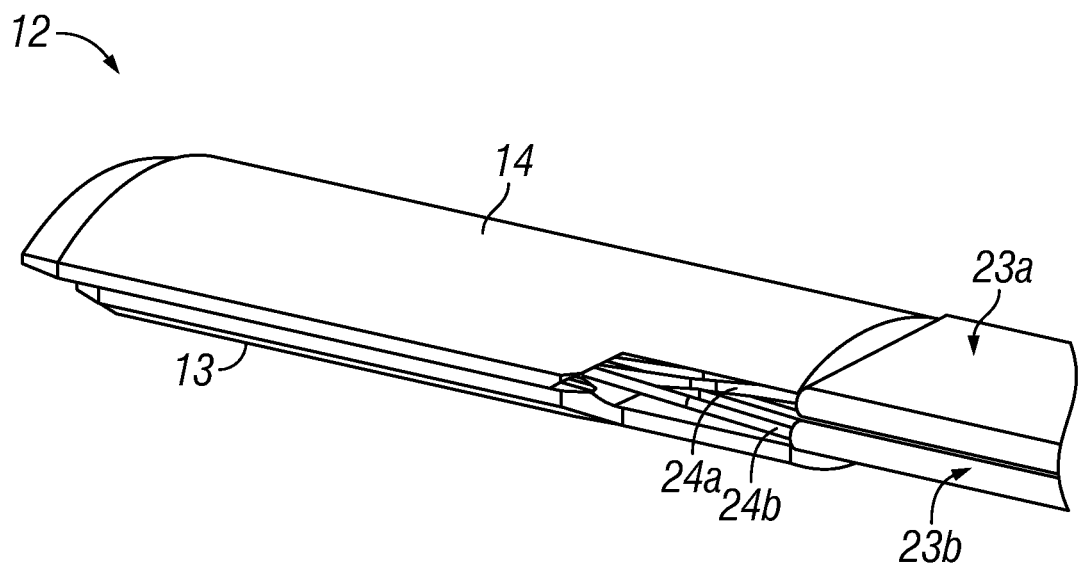
Figure 6C:
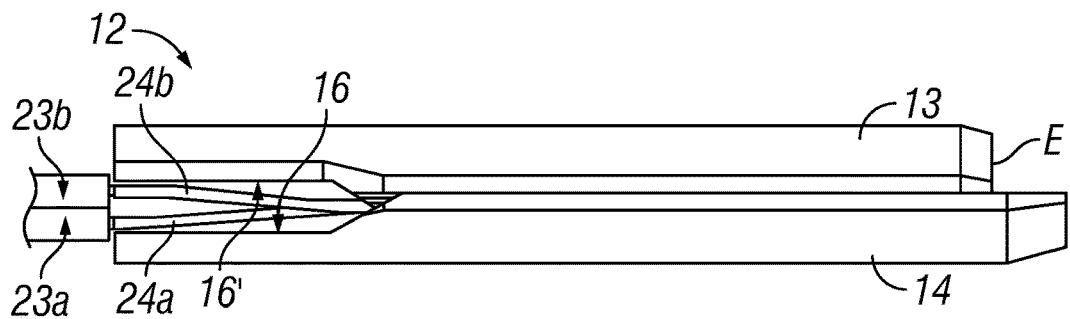
Figure 6D:
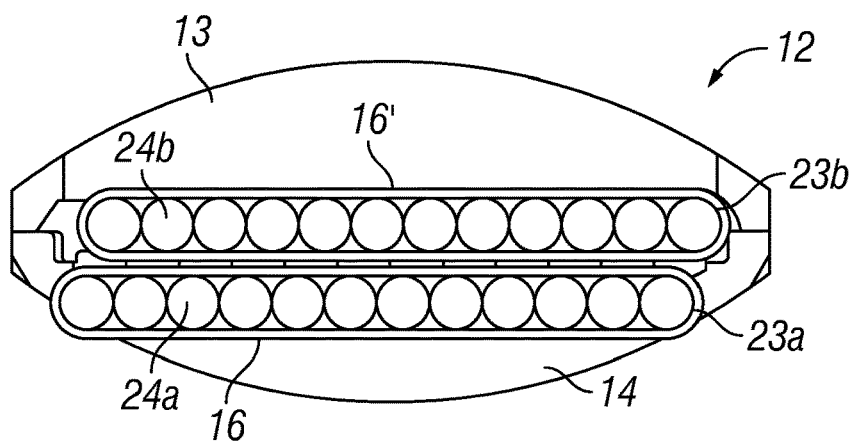
Figure 6E:
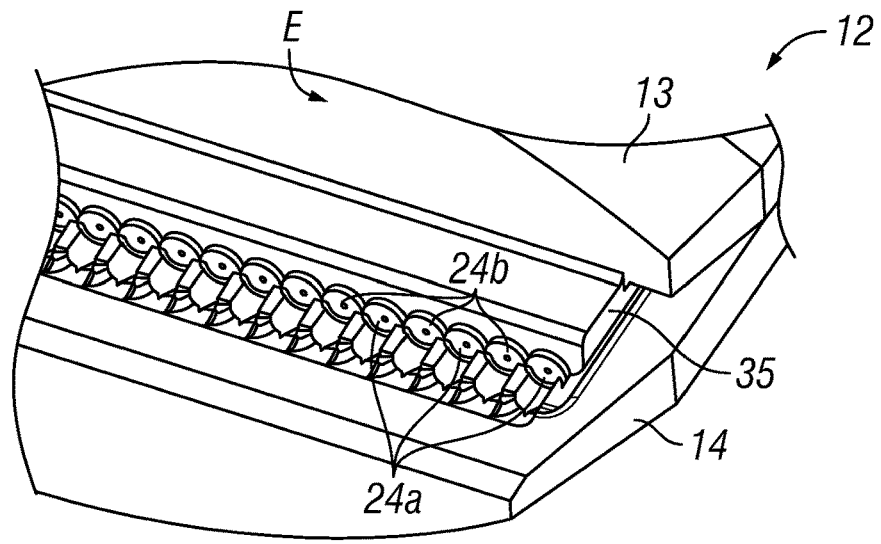

Referring to FIGS. 6A to 6E, the ferrule 12 can accommodate two similar fiber ribbons 23, each having twelve fibers 24, to increase fiber density. As illustrated in FIG. 6E, the optical fibers 24a from the ribbon 23a are interlaced with the optical fibers 24b from the ribbon 23b. As shown in FIGS. 6A-6C, the space defined between platform 16 of ferrule halve 14 and platform 16' of ferrule halve 13 accommodates the two layers of fiber ribbons 23a and 23b.

As was in the case of the ferrule halve 14, the various structures and features of the ferrule halve 13 can be formed by stamping. Specifically, the ferrule halve 13 is formed by stamping a malleable metal material to integrally and simultaneously define the exterior curved surface 15', the platform 16', the cover portion 35, and the features on the interior surface 39' (including the grooves 34'). Effectively, a one-piece open ferrule halve 13 can be produced to complement the ferrule halve 14 to support the optical fibers 24 with their ends in precise location and alignment with respect to the reflective surfaces R on the ferrule halve 14, and further in alignment to the external geometry of the ferrule halve 13 as well as to the features of the ferrule halve 14. As noted above in reference to the ferrule halve 14, the present invention relies on the contact between the alignment sleeve 20 and the ferrule 12 (including the ferrules halves 13 and 14) and the contact between the ends of the ferrules (12R, 12S in FIGS. 1 and 2) in the alignment sleeve 20, to define the alignment of the optical fibers and the reflective surfaces R in the ferrule 12 with respect to another similar ferrule 12, as was in the case of ferrules 12R and 12S aligned by a sleeve 20 in FIG. 2.

For the ferrules described above, given optical alignment of adjoining ferrules at the optical fiber connectors relies on alignment sleeves, the external surfaces of the ferrule should be maintained at high tolerance as well for alignment using an alignment sleeve. In the embodiments described above, no alignment pin is required for alignment of a pair of ferrules. Accordingly, for stamping the ferrule halves, that would include stamping all the critical features of the entire body of the ferrule halves, including forming the grooves, reflective surfaces, mating surfaces of the ferrule portions, and external surfaces that come into contact with the alignment sleeve and the ends of another ferrule. In one embodiment, the alignment sleeve may be precision formed by stamping as well. This maintains the dimensional relationship between the grooves and external alignment surfaces of the ferrules, to optical facilitate alignment using alignment sleeves only without relying on alignment pins.

In one embodiment, the ferrule body is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). Each ferrule halve may be stamped to form a unitary or monolithic body, which does not require further attachment of sub-components within each ferrule halve.

Figure 7A:
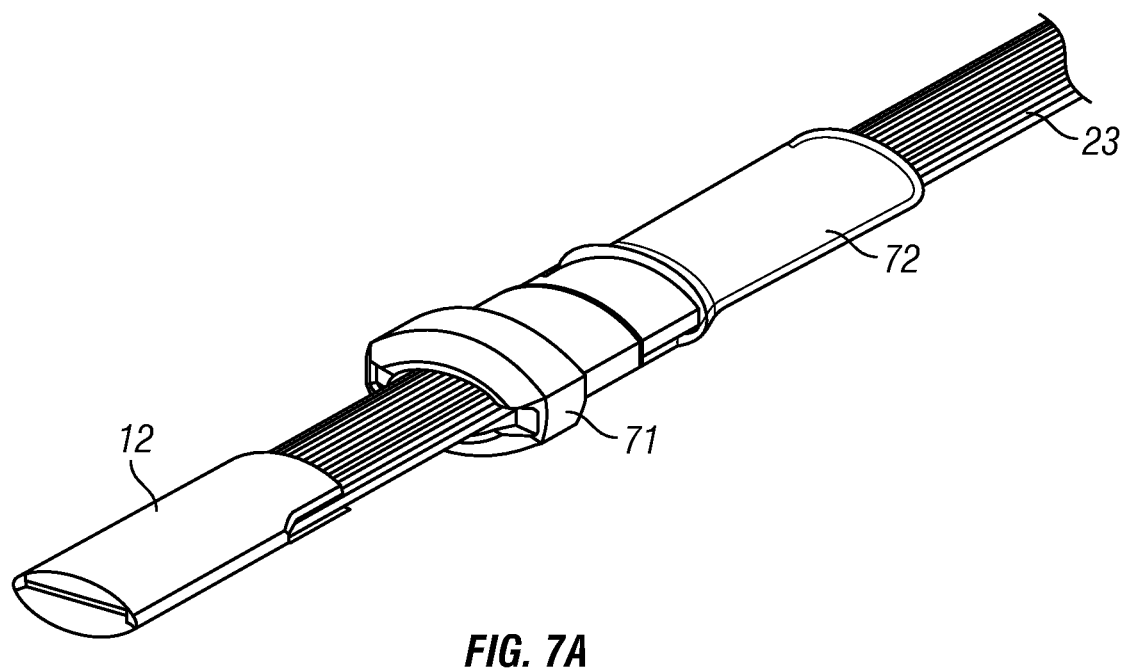
FIGS. 7A-7D illustrate an optical fiber connector incorporating the ferrule assembly in FIG. 3, in accordance with one embodiment of the present invention.
Figure 7B:
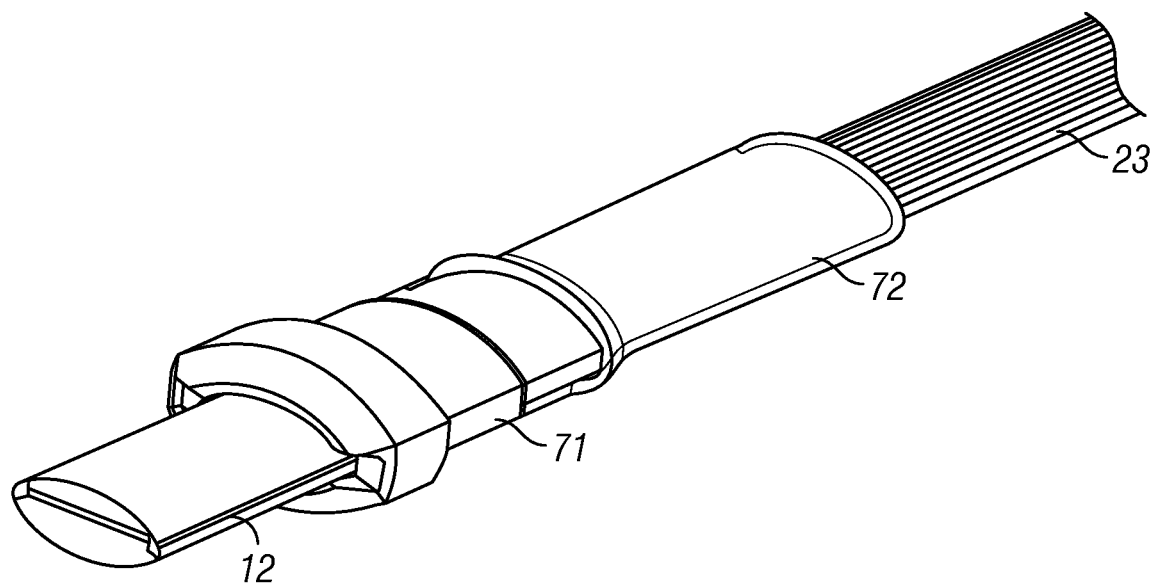
Figure 7C:
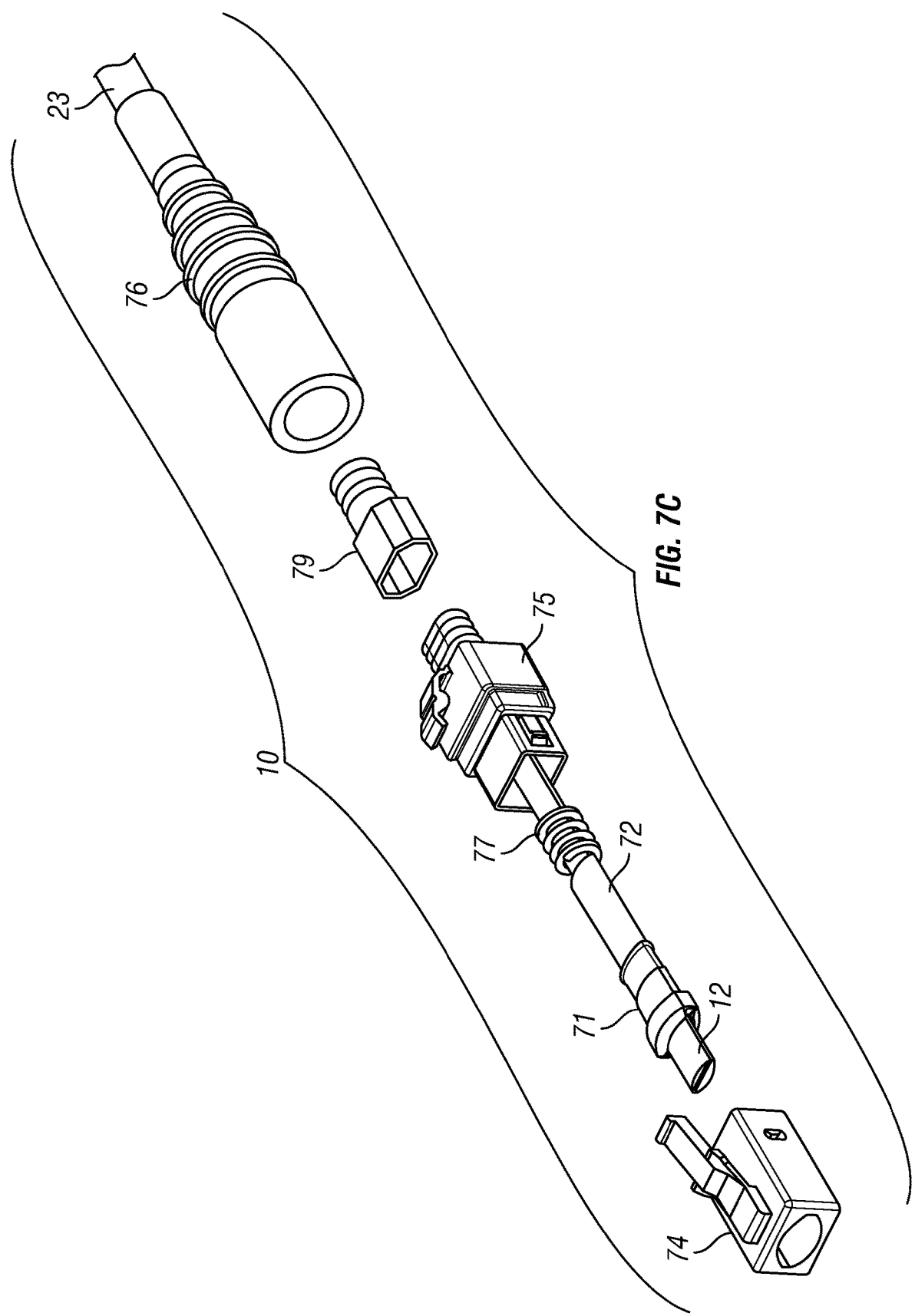
Figure 7D:
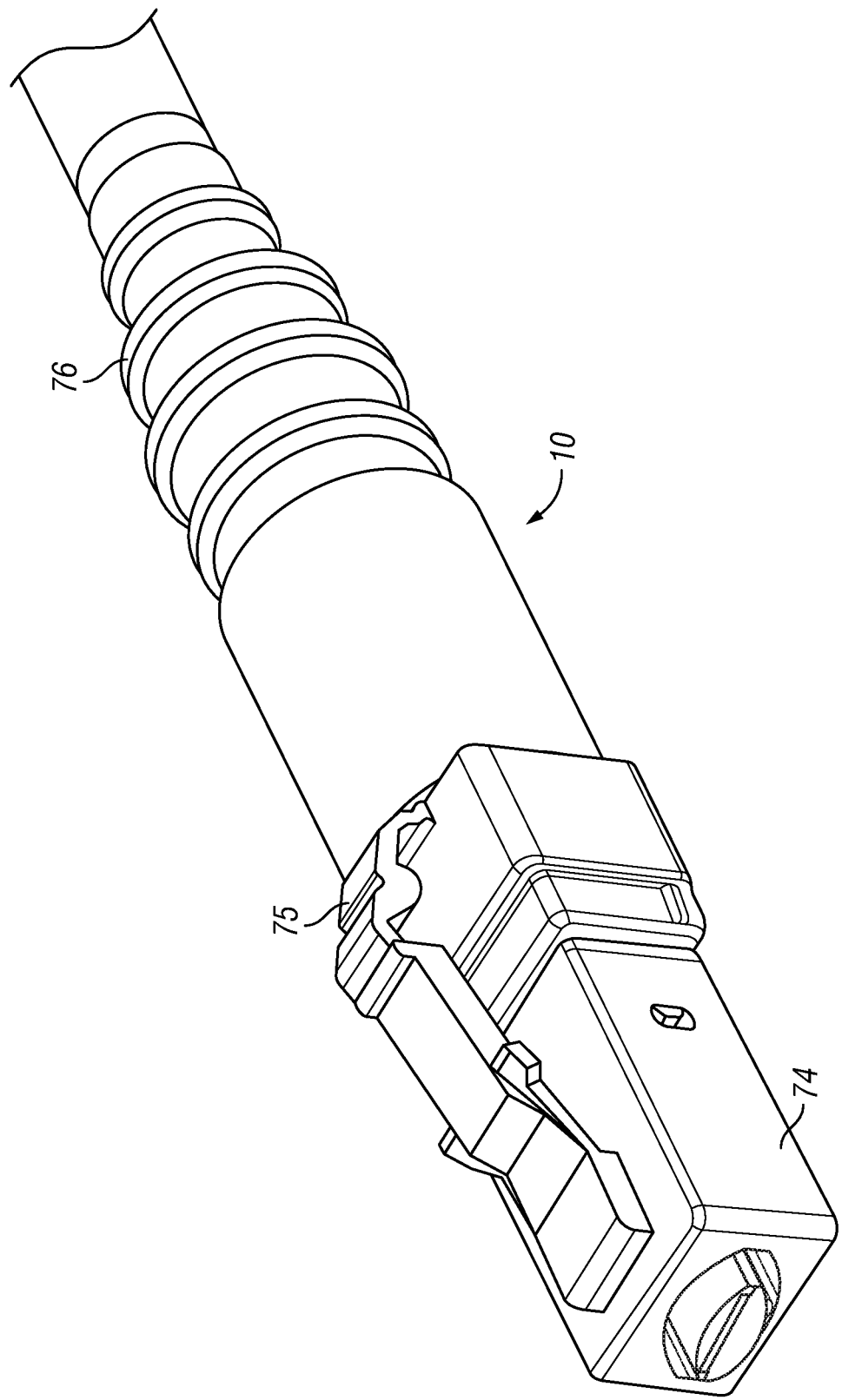

In another aspect of the present invention, the ferrule assembly is incorporated in an optical fiber connector. Referring to FIGS. 7A to 7D, a connector 10 having the form factor of an LC connector housing incorporates the ferrule 12 discussed above. In FIG. 7A, the ferrule 12 is pressed into an opened end of a holder 71, to the form shown in FIG. 7B. A flexible sleeve in the form of a shrink wrap 72 is provided at the other end of the holder 71, through which the fiber ribbon 23 extends. In FIG. 7C, the ferrule 12 is inserted into a ferrule housing 74, and the holder 71 is inserted into a connector housing 75 via a preload spring 77. A crimp 79 holds the holder 71 in place in the connector housing 75. A boot 76 covers the crimped end. FIG. 7D illustrates the completed connector 10. Complementary connectors having similar ferrules may be optically connected using an alignment sleeve 20, similar to the schematic shown in FIGS. 1 and 2.

The ferrule in accordance with the present invention overcomes many of the deficiencies of the prior art, resulting in an optical fiber expanded beam connector with low insertion and return losses, which provides ease of use and high reliability with low environmental sensitivity, and which can be fabricated at low cost.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. An expanded beam ferrule comprising:
a first ferrule halve having at least one reflective surface; and
a second ferrule halve, which together retain at least one optical fiber,
wherein the reflective surface reflects light perpendicular to a plane of the first ferrule halve facing the second ferrule halve, wherein the reflective surface is defined at an extended section of the first ferrule halve which extends beyond the second ferrule halve, wherein the reflective surface is an exposed free surface of the first ferrule halve at which incident light is directed; wherein the exposed free surface has an exposed free side facing an end of the optical fiber, and wherein light to and from the end of the optical fiber is reflected by the exposed free side of the reflective surface.

2. An expanded beam ferrule connector comprising:
a first expanded beam ferrule and a second expanded beam ferrule, wherein each of the first and second expanded beam ferrule comprises:
a first ferrule halve having at least one reflective surface; and
a second ferrule halve,
wherein the first ferrule halve and the second ferrule halve together retain at least one optical fiber, wherein the reflective surface reflects light perpendicular to plane of the first ferrule halve facing the second ferrule halve, and wherein the reflective surface is defined at an extended section of the first ferrule halve which extends beyond the second ferrule halve;
a sleeve aligning external surfaces of the first and second ferrules, wherein the first and second ferrules are aligned longitudinally with the extended section on the first ferrule halve of the first ferrule overlapping the extended section of the first ferrule halve of the second ferrule, with the reflective surfaces of the respective ferrules facing each other, wherein output light from the optical fiber held in the first ferrule is bent and collimated by a reflective surface, transmitted to the facing reflective surface in a second ferrule aligned by the sleeve, which bends the light to input to the optical fiber held in the second ferrule.

3. The expanded beam ferrule connector as in claim 2, wherein expanded light beam between the first and second ferrules is perpendicular to the longitudinal axis of the sleeve.

4. The expanded beam ferrule connector as in claim 2, wherein a collimated light is transmitted between the facing reflective surfaces of the first and second ferrules aligned by the sleeve.

5. The expanded beam ferrule connector as in claim 3, wherein the reflective surface is an exposed free surface of the first ferrule halve at which incident light is directed.

6. The expanded beam ferrule connector as in claim 5, wherein the reflective surface is a concave reflective surface.

7. An expanded beam ferrule connector, comprising:
a first expanded beam ferrule, comprising:
a first ferrule halve having at least one reflective surface; and
a second ferrule halve,
wherein the first ferrule halve and the second ferrule halve together retain at least one optical fiber, wherein the reflective surface reflects light perpendicular to a plane of the first ferrule halve facing the second ferrule halve, and wherein the reflective surface is defined at an extended section of the first ferrule halve which extends beyond the second ferrule halve;
a second expanded beam ferrule, comprising:
a first ferrule halve having at least one reflective surface; and a second ferrule halve,
wherein the first ferrule halve and the second ferrule halve together retain at least one optical fiber, wherein the reflective surface reflects light perpendicular to plane of the first ferrule halve facing the second ferrule halve, and wherein the reflective surface is defined at an extended section of the first ferrule halve which extends beyond the second ferrule halve;
a sleeve aligning external surfaces of the first and second ferrules, wherein the first and second ferrules are aligned longitudinally with the extended section on the first ferrule halve of the first ferrule overlapping the extended section of the first ferrule halve of the second ferrule, with the reflective surfaces of the respective ferrules facing each other, wherein output light from the optical fiber held in the first ferrule is bent and collimated by a reflective surface, transmitted to the facing reflective surface in a second ferrule aligned by the sleeve, which bends the light to input to the optical fiber held in the second ferrule.

8. The expanded beam ferrule connector as in claim 7, wherein expanded light beam between the first and second ferrules is perpendicular to the longitudinal axis of the sleeve.

9. The expanded beam ferrule connector as in claim 7, wherein the reflective surface is an exposed free surface of the first ferrule halve at which incident light is directed.

10. The expanded beam ferrule connector as in claim 9, wherein the reflective surface is a concave reflective surface.

11. The expanded beam ferrule connector as in claim 2, wherein a collimated light is transmitted between the facing reflective surfaces of the first and second ferrules aligned by the sleeve.

12. An expanded beam optical connector, comprising:
a first and a second expanded beam ferrule, each comprising:
  a first ferrule halve having at least one reflective surface; and
  a second ferrule halve, which together retain at least one optical fiber,
  wherein the reflective surface reflects light perpendicular to a plane of the first ferrule halve facing the second ferrule halve, and wherein the reflective surface is defined at an extended section of the first ferrule halve which extends beyond the second ferrule halve;
an external alignment sleeve aligns external surfaces of the first and second ferrules, wherein the first and second ferrules are aligned longitudinally with the extended section on the first ferrule halve of the first ferrule overlapping the extended section of the first ferrule halve of the second ferrule, with the reflective surfaces of the respective ferrules facing each other,
wherein output light from the optical fiber held in the first ferrule is bent and collimated by a reflective surface, transmitted to the facing reflective surface in a second ferrule aligned by the sleeve, which bends the light to input to the optical fiber held in the second ferrule, and
wherein a collimated light is transmitted between the facing reflective surfaces defined at the respective extended sections of the first ferrule halve of the first ferrule and the first ferrule halve of the second ferrule.

13. The expanded beam optical connector as in claim 12, wherein expanded light beam between the first and second ferrules is perpendicular to the longitudinal axis of the alignment sleeve.

14. The expanded beam optical connector as in claim 12, wherein the reflective surface is an exposed free surface of the first ferrule halve at which incident light is directed.

15. The expanded beam optical connector as in claim 14, wherein the reflective surface is a concave reflective surface.

16. The expanded beam optical connector as in claim 12, wherein a collimated light is transmitted between the facing reflective surfaces of the first and second ferrules aligned by the alignment sleeve.

17. A method of producing an expanded beam ferrule as in claim 1, comprising forming the first ferrule halve including the reflective surface by stamping a metal blank.

18. A method of producing an expanded beam ferrule connector as in claim 2, comprising forming the first ferrule halve including the reflective surface by stamping a metal blank.

19. A method of producing an expanded beam optical connector as in claim 12, comprising forming the first ferrule halve including the reflective surface by stamping a metal blank.

* * * * *